United States Patent
Russell, II et al.

(10) Patent No.: US 7,231,333 B2
(45) Date of Patent: Jun. 12, 2007

(54) METHOD AND ARRANGEMENT FOR DEVELOPING CORE LOADING PATTERNS IN NUCLEAR REACTORS

(75) Inventors: William Earl Russell, II, Wilmington, NC (US); David Joseph Kropaczek, Kure Beach, NC (US); Steven Barry Sutton, Wilmington, NC (US); William Charles Cline, Wilmington, NC (US); Christian Carlos Oyarzun, Wilmington, NC (US); Glen Alan Watford, Wilmington, NC (US); Carey Reid Merritt, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 627 days.

(21) Appl. No.: 10/401,602

(22) Filed: Mar. 31, 2003

(65) Prior Publication Data

US 2004/0220787 A1 Nov. 4, 2004

(51) Int. Cl.
*G06F 9/455* (2006.01)

(52) U.S. Cl. .......................... 703/6; 376/352; 376/411; 376/381; 376/256; 706/11

(58) Field of Classification Search .................. 703/13, 703/6, 2, 14; 376/353, 411, 381, 245, 435, 376/122, 254, 283, 259, 256; 706/11; 717/141; 345/473
See application file for complete search history.

(56) References Cited

U.S. PATENT DOCUMENTS

| | | | |
|---|---|---|---|
| 4,851,186 A * | 7/1989 | Berte et al. ................. 376/364 |
| 5,790,618 A * | 8/1998 | Fawks, Jr. .................. 376/259 |
| 5,923,717 A * | 7/1999 | Fawks, Jr. .................. 376/245 |
| 6,026,136 A * | 2/2000 | Radkowsky ................. 376/173 |
| 6,208,982 B1 * | 3/2001 | Allen et al. .................... 706/11 |
| 6,243,860 B1 * | 6/2001 | Holland ...................... 717/141 |
| 6,263,038 B1 * | 7/2001 | Kantrowitz et al. ........ 376/435 |
| 6,338,149 B1 * | 1/2002 | Ciccone et al. ............... 714/38 |
| 6,404,437 B1 * | 6/2002 | Russell et al. .............. 345/473 |
| 6,430,247 B1 * | 8/2002 | Mourlevat et al. .......... 376/254 |
| 6,526,116 B1 * | 2/2003 | Nguyen et al. ............. 376/439 |
| 6,701,289 B1 * | 3/2004 | Garnett et al. ................ 703/14 |
| 6,748,348 B1 * | 6/2004 | Russell, II ..................... 703/6 |
| 6,934,350 B1 * | 8/2005 | Challberg et al. ........... 376/353 |
| 2002/0085660 A1 * | 7/2002 | Nakamaru et al. .......... 376/283 |
| 2002/0101949 A1 * | 8/2002 | Nordberg .................... 376/122 |
| 2002/0101951 A1 * | 8/2002 | Nakamura et al. .......... 376/282 |
| 2003/0086520 A1 * | 5/2003 | Russell et al. .............. 376/259 |
| 2004/0013220 A1 * | 1/2004 | Casillas et al. ............. 376/245 |

(Continued)

*Primary Examiner*—Paul Rodriguez
*Assistant Examiner*—Kandasamy Thangavelu
(74) *Attorney, Agent, or Firm*—Harness, Dickey & Pierce, P.L.C.

(57) ABSTRACT

In the method, a set of limits applicable to a core may be defined, and a test core loading pattern design, to be used for loading the core, may be determined based on the limits. Reactor operation on at least a subset of the core may be simulated to produce a plurality of simulated results. The simulated results may be compared against the limits, and data from the comparison may indicate whether any of the limits were violated by the core during the simulation. A designer or engineer may use the data to modify the test core loading pattern, creating one or more derivative core loading pattern design(s) for simulation and eventual perfection as an acceptable core loading pattern design for the core.

30 Claims, 15 Drawing Sheets

U.S. PATENT DOCUMENTS

| | | | |
|---|---|---|---|
| 2004/0052326 A1* | 3/2004 | Blanpain et al. | 376/411 |
| 2004/0059549 A1* | 3/2004 | Kropaczek et al. | 703/2 |
| 2004/0059696 A1* | 3/2004 | Kropaczek et al. | 706/46 |
| 2004/0066875 A1* | 4/2004 | Bazant | 376/381 |
| 2004/0096101 A1* | 5/2004 | Mori et al. | 382/162 |
| 2004/0101083 A1* | 5/2004 | Russell et al. | 376/256 |
| 2004/0122629 A1* | 6/2004 | Russell et al. | 703/2 |
| 2004/0191734 A1* | 9/2004 | Russell et al. | 434/218 |
| 2004/0220787 A1* | 11/2004 | Russell et al. | 703/6 |
| 2005/0015227 A1* | 1/2005 | Kropaczek et al. | 703/6 |
| 2005/0018806 A1* | 1/2005 | Gautier et al. | 376/406 |
| 2006/0149514 A1* | 7/2006 | Kropaczek et al. | 703/6 |

* cited by examiner

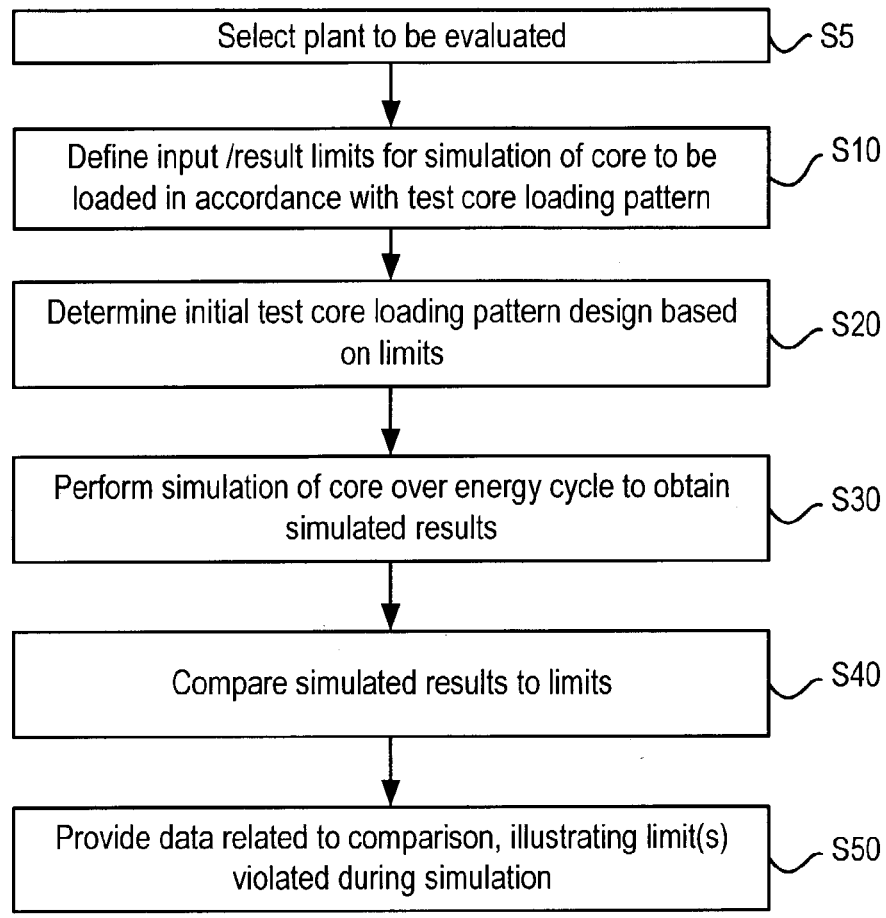
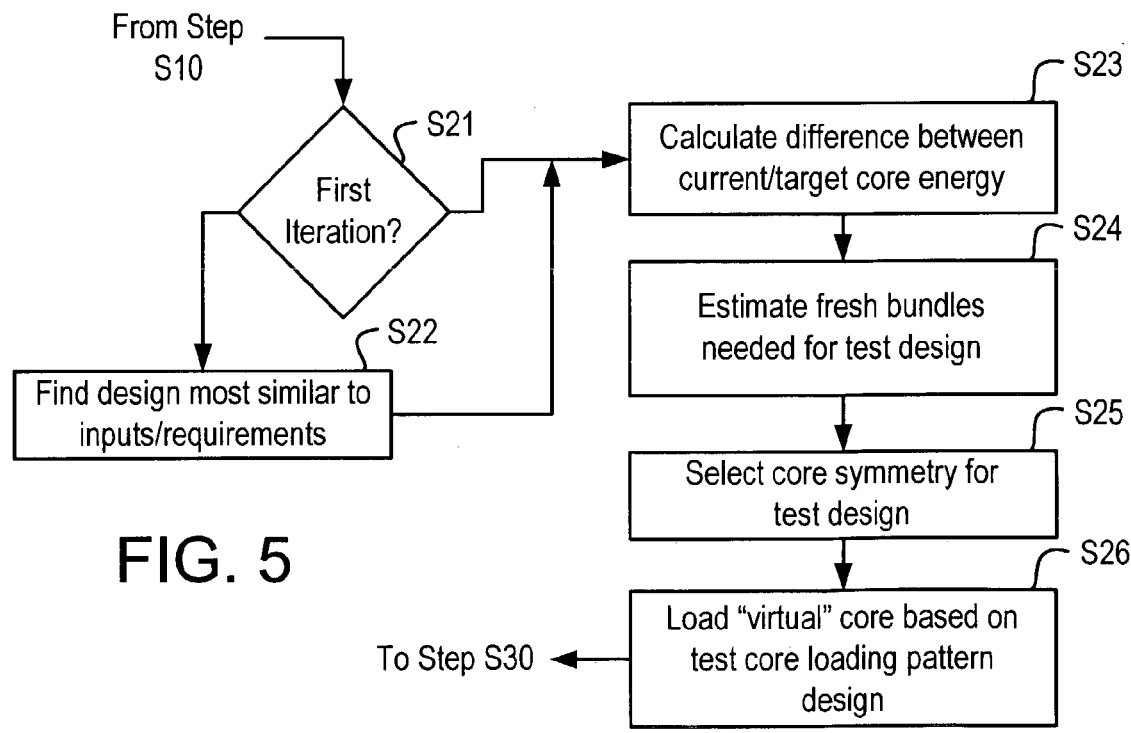

FIG. 9

| Optimization Constraints | | | | | |
|---|---|---|---|---|---|
| Constraint Description | Importance | Exposure Dependence | Design Value | Objective Add Funct. | Optimization Credits |
| Maximum MFLCPR | Nominal | ☐ Edit | 0.964 | ☐ | None |
| Maximum MFLPD | Nominal | ☐ Edit | 0.957 | ☐ | None |
| Maximum MAPLHGR | Nominal | ☐ Edit | 0.957 | ☐ | None |
| Minimum % Flow | Nominal | ☐ Edit | 85.0 | ☐ | None |
| Maximum % Flow | Nominal | ☐ Edit | 100.0 | ☐ | None |
| Eigenvalue Upper Tolerance (Δ Cycle) | None | ☐ Edit | 1.0E-4 | ☐ | None |
| Eigenvalue Lower Tolerance (Δ Cycle) | None | ☐ Edit | 1.0E-4 | ☐ | None |
| EOC Eigenvalue Upper Tolerance | None | | 0.0 | ☐ | None |
| EOC Eigenvalue Lower Tolerance | Nominal | | 0.0 | ☐ | Nominal |
| Minimum Cycle Length (MWD/st) | None | | 11500.0 | ☐ | None |
| Maximum Nodal Exposure Ratio (NEXRAT) | None | | 0.0 | ☐ | None |
| Maximum Bundle Average Exposure @ EOC | None | | 0.0 | ☐ | None |
| Minimum % Shutdown Margin | Nominal | ☐ Edit | 1.5 | ☐ | None |
| Maximum % Hot Excess | None | ☐ Edit | 0.0 | ☐ | None |
| Minimum % SLICS Margin | None | ☐ Edit | 0.0 | ☐ | None |
| Minimum % Hot Excess @ 200 | None | | 0.0 | ☐ | None |
| Maximum Hot Excess Slope (%/(MWD/st)) | None | | 0.0 | ☐ | None |
| Minimum Average Void Fraction | None | ☐ Edit | 0.0 | ☐ | None |
| Maximum Average Void Fraction | None | ☐ Edit | 0.0 | ☐ | None |
| Minimum Axial Void Tilt (AVT) | None | ☐ Edit | 0.0 | ☐ | None |
| Maximum Axial Void Tilt (AVT) | None | ☐ Edit | 0.0 | ☐ | None |
| Minimum Axial Power Tilt (APT) | None | ☐ Edit | 0.0 | ☐ | None |
| Maximum Axial Power Tilt (APT) | None | ☐ Edit | 0.0 | ☐ | None |
| Minimum Axial Peak | None | ☐ Edit | 0.0 | ☐ | None |
| Maximum Axial Peak | None | ☐ Edit | 0.0 | ☐ | None |
| Maximum Integrated Power | None | ☐ Edit | 0.0 | ☐ | None |

905 — Importance column callout
910 — Design Value column callout

FIG. 10

FIG. 15 ePrometheus - Hatch 1 - Cycle 1 - Test 5b - CS10:2671 <Online Operation>

WorkSpace  Input  Run  View  Reports  Window  Help

Input Deck

| Plant Configuration | Optimization Configuration | Optimization Constraints | Operations Configuration | Fuel Shuffling | Eigenvalue & Operating Limit | Select Files |

Optimization Configuration

| Constraint Description | Importance | Exposure Dependence | Design Value | Objective Add Funct. | Optimization Credits |
|---|---|---|---|---|---|
| Maximum MFLCPR — 1550 | Nominal | ☐ | Edit | 0.964 | ☐ | None |
| Maximum MFLPD — 1556 | Nominal | ☐ | Edit | 0.957 — 1552 | ☐ — 1554 | None |
| Maximum MAPLHGR | Nominal | ☐ | Edit | 0.957 | ☐ | None |
| Minimum % Flow | Nominal | ☐ | Edit | 85.0 | ☐ | None |
| Maximum % Flow | None | ☐ — 1558 | Edit | 100.0 | ☐ | None |
| Eigenvalue Upper Tolerance (ΔCycle) | None | ☐ | Edit | 1.0E-4 | ☐ | None |
| Eigenvalue Lower Tolerance (ΔCycle) | | ☐ | Edit | 1.0E-4 | ☐ | None |

METHOD AND ARRANGEMENT FOR DEVELOPING CORE LOADING PATTERNS IN NUCLEAR REACTORS

BACKGROUND OF THE INVENTION

1. Field of the Invention

This invention relates to developing core loading pattern designs for a core of a nuclear reactor.

2. Related Art

A nuclear reactor such as a boiling water reactor (BWR) or pressurized water reactor (PWR), for example, may operate from about one to two years on a single core loading of fuel. Upon completion of a given period (energy cycle), approximately ¼ to ½ of the least reactive fuel (oldest or most burnt) may be discharged from the reactor.

The operation of the cycle may depend on the placement of the fuel assemblies (fresh fuel, once-burnt fuel, twice-burnt fuel, etc.). Due to the presence of burnable poisons in the core, such as gadolinium, for example, the characteristics of the fresh fuel, once-burnt fuel, and twice-burnt fuel assemblies may be different. The fresh fuel assembly is typically less reactive at the Beginning-of-Cycle (BOC), as compared to a once-burnt fuel bundle, due to the presence of gadolinium. At the End-of-Cycle (EOC), since most or all of the poison has burnt out, the fresh assemblies are typically more reactive than the once-burnt fuel. Although the shape of an exposure dependent reactivity curve of the twice-burnt fuel may be similar to that of the once-burnt fuel, the reactivity of the twice-burnt fuel is smaller in magnitude. By combining fresh, once-burnt, and twice-burnt fuel assemblies, however, a substantially even reactivity may be achieved across the core, throughout the energy cycle.

In addition to reactivity considerations, the placement of fuel assemblies ("fuel bundles") may impact thermal limits, power shaping, and fuel cycle economics. If fuel bundles, too high in reactivity, are placed face-adjacent, inadequate margin to reactivity thresholds or thermal limits may result. Cycle length may also be increased by the placement of a greater number of reactive bundles toward the center of the core, rather than placing these reactive fuel bundles at the periphery of the core. Accordingly, a core loading pattern may define many of the most important considerations for a nuclear fuel cycle.

Traditionally, core loading design determinations have been made on a trial and error basis. A current process being used is a stand-alone manual core loading pattern design process that requires a designer to repeatedly enter reactor plant specific operational parameters into an ASCII text file, which is an input file. Data entered into the input file may include blade notch positions of control blades (if the evaluated reactor is a boiling water reactor (BWR)), core flow, core exposure, which may be the amount of burn in a core energy cycle, measured in mega-watt (or giga-watt days per short time (MWD/st, GWD/st), etc.

A Nuclear Regulatory Commission (NRC) licensed core simulation program reads the resulting input file and outputs the results of the simulation to a text or binary file. A designer then may evaluate the simulation output to determine if the design criteria has been met, and to verify that no violations of margins to thermal limits have occurred. Failure to meet design criteria (i.e., violations of one or more limits) require a manual modification to the input file. Specifically, the designer would manually change one or more operation parameters, and re-perform the core simulation program. This process was repeated until a satisfactory core loading pattern design was achieved.

This process is extremely time consuming. The required ASCII text files are laborious to construct, and often are error prone. The files are usually ASCII format and extremely long, sometimes exceeding one thousand or more lines of code. A single error in the file could result in a crash of the simulator, or worse, may result in a mildly errant result that could be hard to initially detect, but which would profligate with time and iterations to perhaps reduce core cycle energy, if an actual operating nuclear reactor core was loaded in accordance with the erroneous core loading pattern.

Further, no assistance is provided via the manual iterative process in order to guide a designer toward a more favorable core loading pattern design solution. In the current process, the responsible designer or engineer's experience and intuition are the sole means of determining a core loading pattern design solution.

SUMMARY OF THE INVENTION

Exemplary embodiments of the present invention are directed to a method and arrangement for developing core loading pattern designs, where a set of limits applicable to a core may be defined, and a test core loading pattern design, to be used for loading the core, may be determined based on the limits. Reactor operation on at least a subset of the core may be simulated to produce a plurality of simulated results. The simulated results may be compared against the limits, and data from the comparison may indicate whether any of the limits were violated by the core during the simulation. A designer or engineer may use the data to modify the test core loading pattern, creating one or more derivative core loading pattern design(s) for simulation and eventual perfection as an acceptable core loading pattern design for the core.

BRIEF DESCRIPTION OF THE DRAWINGS

Exemplary embodiments of the present invention will become more fully understood form the detailed description given herein below and the accompanying drawings, wherein like elements are represented like reference numerals which are given by way of illustration only and thus are not limitative of the exemplary embodiments of present invention and wherein:

FIG. 4 is a flow chart describing the method in accordance with an exemplary embodiment of the invention;

FIG. 5 is a flow chart illustrating a test core loading pattern design determining step in accordance with an exemplary embodiment of the invention;

FIGS. 9–15 are screen shots of an exemplary computer-based application to further describe various features of the exemplary embodiments of the present invention.

DETAILED DESCRIPTION

Figure 1:
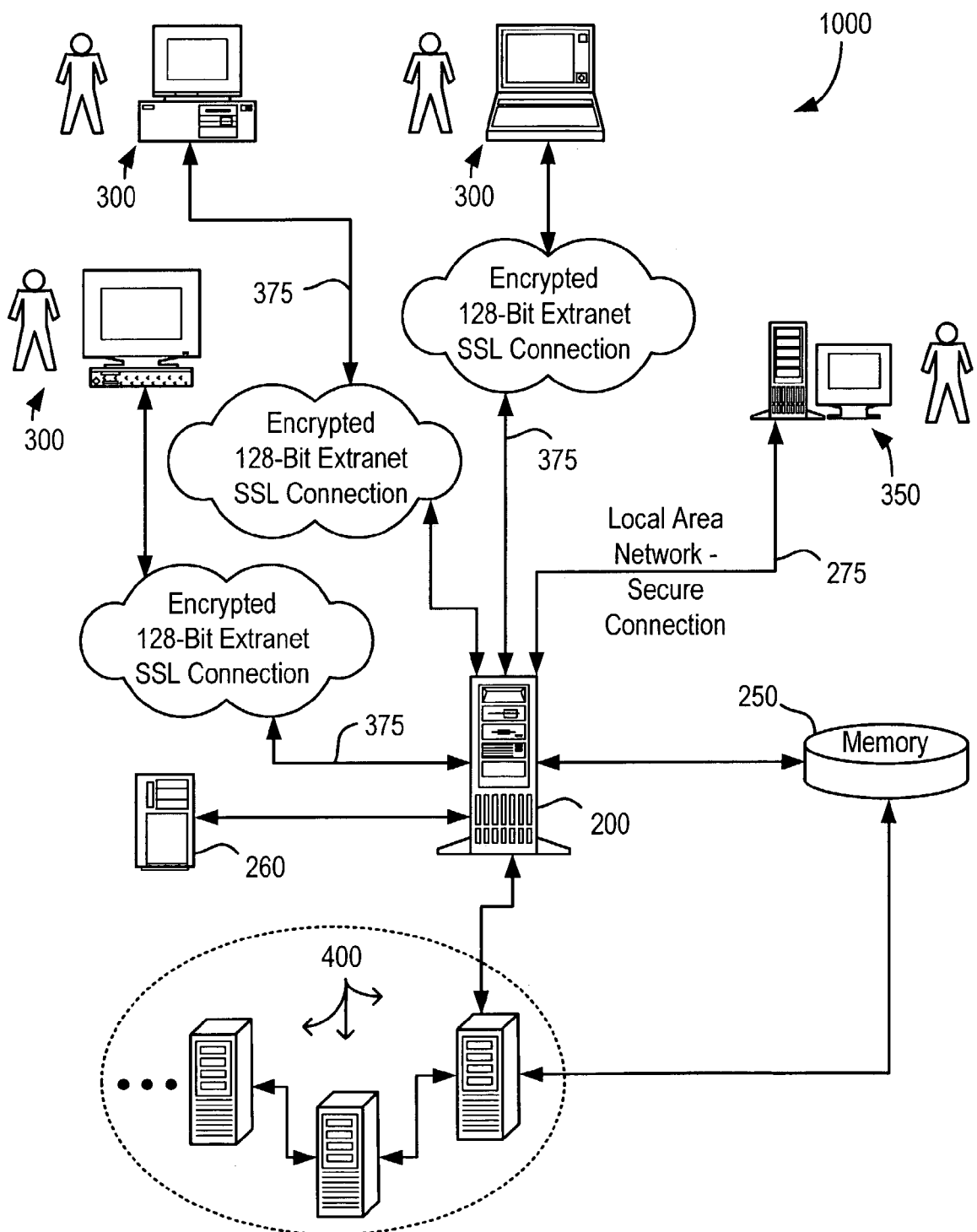
FIG. 1 illustrates an arrangement for implementing the method in accordance with an exemplary embodiment of the invention.

Exemplary embodiments of the present invention are directed to a method and arrangement for developing a core loading pattern design for a nuclear reactor. The arrangement may include a graphical user interface (GUI) and a processing medium (e.g., software-driven program, processor, application server, etc.) to enable a user to virtually create core loading pattern designs for a core. Data related to simulation of the core loaded in accordance with the core loading pattern may be reviewed on a suitable display device by the user. The arrangement may provide feedback to the user, based on how closely a core loaded with a proposed core loading pattern design solution meets user input limits or constraints for simulated nuclear reactor operation.

The user, via the GUI, may input limits, which may be plant specific constraint data, for example, that may be applicable to a core of a selected reactor plant, which is to be loaded for simulation, e.g., a "virtual core", based on a test core-loading pattern design. For example, the constraint data or limits may be defined as a set of limiting or target operating and core performance values for a specific reactor plant or core energy cycle. Via the GUI, a user may determine an initial test core loading pattern design, may initiate a reactor simulation (e.g., a three dimensional simulation using simulation codes licensed by the NRC) of the core loaded based on the test core loading pattern design, and view results from the simulation.

In accordance with the exemplary embodiments, an objective function may be used to compare how closely a simulated core loaded with the core loading pattern design meets the limits or constraints. An objective function is a mathematical equation that incorporates the constraints or limits and quantifies the core loading pattern design's adherence to the limits. For example, based upon the results of the simulation and the calculated objection function values, the user, who may be a core designer, engineer or plant supervisor, and any person granted access to the arrangement, for example, may be able to determine if a particular design meets the user's design (limit) requirements (i.e., meets a maximum cycle energy requirement). Via the GUI, the user may then modify the test core loading pattern design to create a derivative core loading pattern design, and issue commands to repeat the simulation to determine if there is any performance improvement in the derivative core loading pattern design. Further, the user, via the GUI, may iterate certain functions, such as simulation, comparison of results to limits, modify design if limits are violated, etc., to generate N core loading pattern designs, until a core simulated with an Nth design satisfies all limits, or satisfies all limits within a margin that is acceptable to the user.

The exemplary embodiments of the present invention may utilize a computing environment to effect a tenfold reduction in the amount of time needed to create desirable core loading pattern design for a nuclear reactor, as compared to the current manual iterative process. The resultant core loading pattern design may adhere almost perfectly and/or exactly to a user's input constraints or design limits, since a core loading pattern design is not complete until an objective function value for a particular design solution equals zero.

As compared to prior art manual iterative processes, greater operational flexibility to change core loading pattern designs rapidly and simulate the altered designs may be possible. Errors are no longer made in attempting to generate a simulator input file, as described with respect to the manual iterative process.

FIG. 1 illustrates an arrangement for implementing the method in accordance with and exemplary embodiment of the invention. Referring to FIG. 1, arrangement 1000 may include an application server 200, which may serve as a central nexus of an accessible website, for example. The application server 200 may be embodied as any known application server, such as a WINDOWS 2000 application server, for example. Application server 200 may be operatively connected to a plurality of calculation servers 400, a cryptographic server 260 and to a memory 250. Memory 250 may be embodied as a relational database server, for example.

A plurality of external users 300 may communicate with application server 200 over a suitable encrypted medium such as an encrypted 128-bit secure socket layer (SSL) connection 375, although the exemplary embodiments of the present invention are not limited to this encrypted communication medium. A user 300 may connect to the application server 200 over the internet, for example, from any one of a personal computer, laptop, personal digital assistant (PDA), etc., using a suitable interface such as a web-based internet browser. Further, application server 200 may be accessible to internal users 350 via a suitable local area network connection (LAN 275), so that internal users 350, from any of a personal computer, laptop, personal digital assistant (PDA), etc. that is part of an intranet (i.e., private network), may have access via the intranet, for example.

The application server 200 may be responsible for online security, for directing all calculations and accessing of data in order to calculate objective function values, and for the creation of suitable graphical representations of various features of a core loading pattern design that a user may review. The graphical information may be communicated over the 128-bit SSL connection 375 or LAN 275, to be displayed on a suitable display device of the users 300/350. Hereinafter, the term "user" refers to both an internal user 300 and an external user 350. For example, the user may be any of a representative of a nuclear reactor plant accessing the website to determine a core loading pattern design for his or her nuclear reactor, a vendor hired by a reactor plant site to develop core loading pattern designs using the exemplary embodiments of the present invention, or any other person permitted access to arrangement 1000 or to another system implementing the method in accordance with the exemplary embodiments of the present invention.

Figure 2:
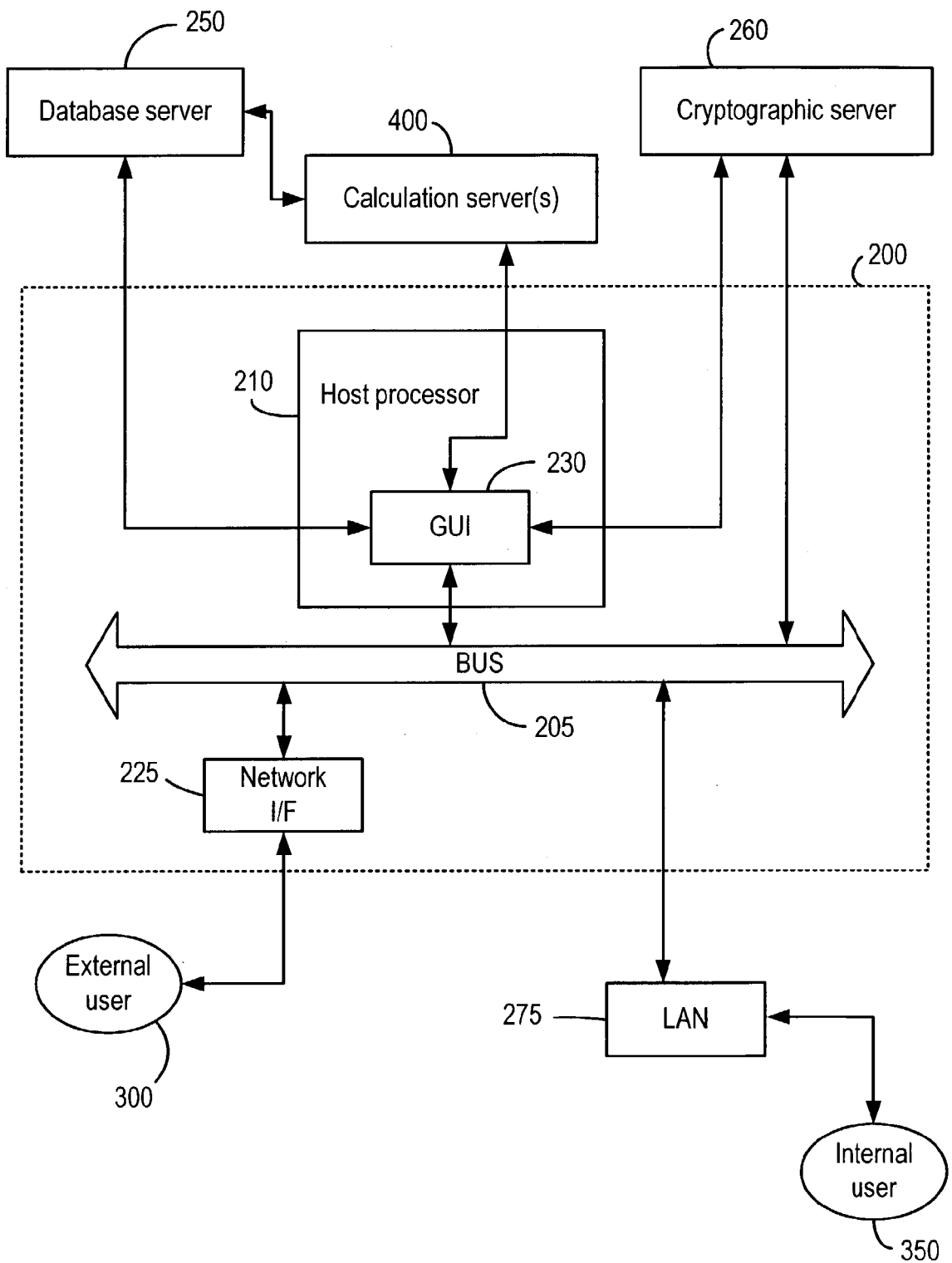
FIG. 2 illustrates an application server of the arrangement for implementing the method in accordance with an exemplary embodiment of the invention.

FIG. 2 illustrates an application server 200 associated with the arrangement of FIG. 1. Referring to FIG. 2, application server 200 may utilize a bus 205 to connect various components and to provide a pathway for data received from the users. Bus 205 may be implemented with conventional bus architectures such as peripheral components interconnect (PCI) bus that us standard in many computer architectures. Alternative bus architectures such as VMEBUS, NUBUS, address data bus, RAMbus, DDR (double data rate) bus, etc. could of course be utilized to implement bus 205. Users may communicate information to application server 200 over a suitable connection (LAN 275 or network interface 225).

Application server 200 may also include a host processor 210, which may be constructed with one or more conventional microprocessors such as currently available PEN- TIUM processors. Host processor 210 may represent a central nexus from which real time and non-real functions in application server 200 are performed, such as graphical-user interface (GUI) and browser functions, directing security functions, directing calculations such as calculation of the objective function values for comparing simulator results to various limits, etc., for display and review by the user. Accordingly, host processor 210 may include a GUI 230, which may be embodied in software as a browser. Browsers are software devices which present an interface to, and interact with, users of the arrangement 1000. The browser is responsible for formatting and displaying user-interface components (e.g., hypertext, window, etc.) and pictures.

Browsers are typically controlled and commanded by the standard hypertext mark-up language (HTML). In accordance with the exemplary embodiments of the present invention, interactive graphical functions and decisions in control flow of a browser such as GUI 230 may be performed with a Virtual Private Network (VPN). Use of a VPN may allow calculation of graphical-related aspects on the application server 200 only, while the resulting images are presented to users 300.

Additionally, or in the alternative, any decisions in control flow of the GUI 230 that require more detailed user interaction may be implemented using JavaScript. Both of these languages may be customized or adapted for the specific details of a given application server 200 implementation, and images may be displayed in the browser using well known JPG, GIF, TIFF and other standardized compression schemes. Other non-standardized languages and compression schemes may be used for the GUI 230, such as XML, "home-brew" languages or other known non-standardized languages and schemes.

Host processor 210 may be operatively connected to a cryptographic server 260. Accordingly, application server 200 may implement security functions through cryptographic server 260, so as to establish a firewall to protect the arrangement 1000 from outside security breaches. Further, cryptographic server 260 may secure all personal information of registered users.

Application server 200 may also be operatively connected to a plurality of calculation servers 400. The calculation servers 400 may perform all the calculations required to process user entered data, direct simulation of a core loading pattern design, calculate objective function values for comparison as to be described in further detail below, and to provide results which may be displayed, via GUI 230, under the direction of application server 200.

The calculation servers 400 may be embodied as WINDOWS 2000 servers, for example. More particularly, the calculation servers 400 may be configured to perform a multitude of complex computations which may include, but are not limited to, configuring the objective function and computing objective function values, executing a 3D simulator program to simulate reactor core operation on a core loaded with a particular test core loading pattern design and to generate outputs from the simulation, providing results data for access and display by a user via GUI 230, and iterating an optimization routine as to be described in further detail below.

Alternatively, the exemplary embodiments may be implemented by a computer program product such as a bundled software program. The software program may be stored in memory 250 and include logic enabling the host processor 210 to drive and implement the method in accordance with the exemplary embodiments of the invention, directing the calculation servers 400, with calculation servers also having access to memory 250.

Figure 3:
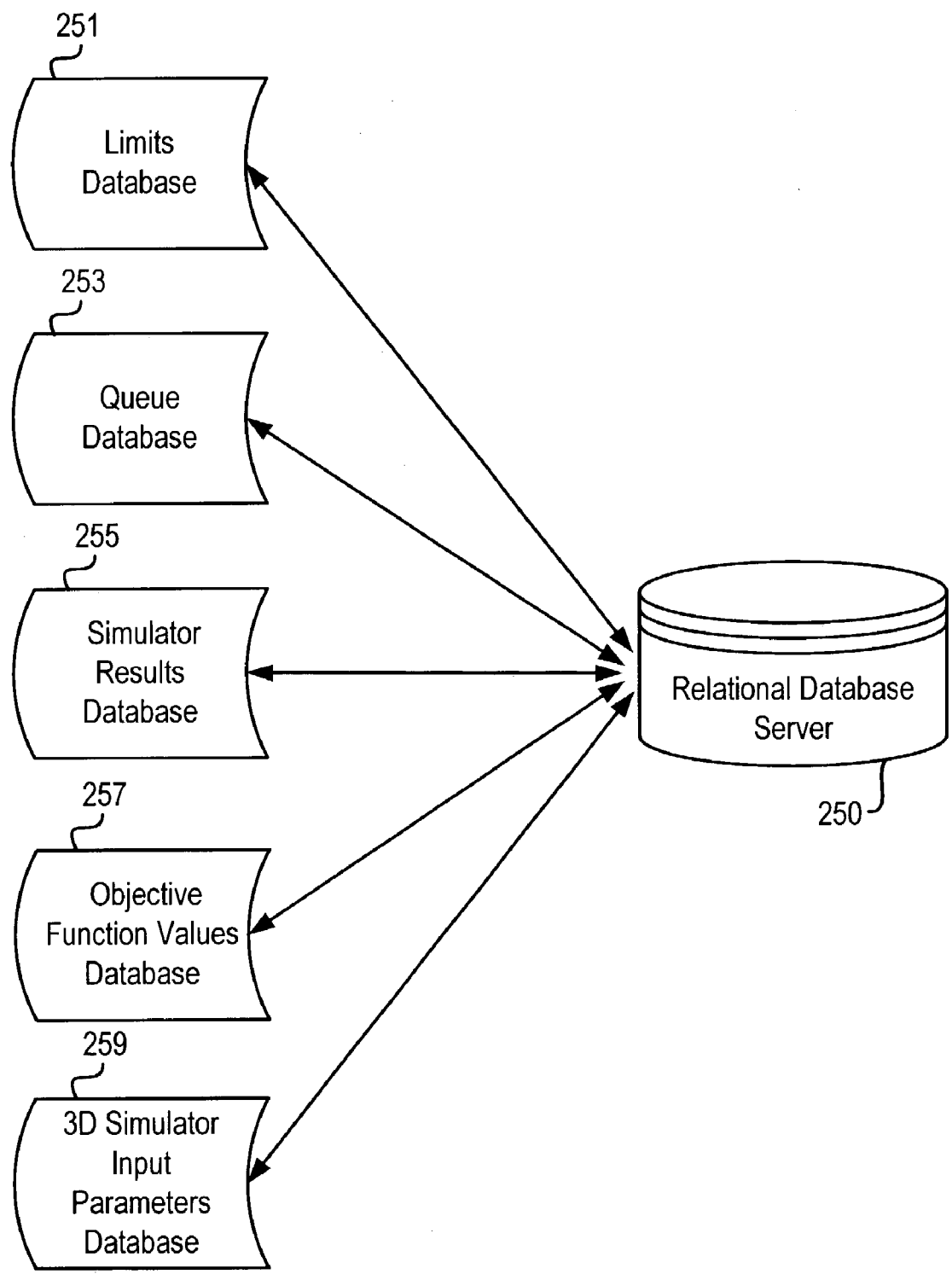
FIG. 3 illustrates a relational database with subordinate databases in accordance with an exemplary embodiment of the invention.

FIG. 3 illustrates an exemplary database server 250 in accordance with an exemplary embodiment of the invention. Memory or database server 250 may be a relational database such as an Oracle 8*i* Alpha ES 40 relational database server. Relational database server 250 may contain a number of subordinate databases that handle all necessary data and results, in order to implement the exemplary embodiments of the present invention. For example, relational database server 250 may include storage areas which contain subordinate databases such as limits database 251, which is a database that stores user input limits and/or design constraints for test core loading pattern designs that are evaluated for a particular nuclear reactor. Additionally, relational database server 250 may include a queue database 253, which stores queue data and parameters for a particular core loading pattern design of a core that is to be simulated in the 3D simulator. Simulator results may be stored in a simulator results database 255.

The simulator results database 255 (and limits database 251) may be accessed by the calculation servers 400 in order to calculate a number of objective function values that may be applicable to a particular test core loading pattern design. These objective function values may be stored in an objective function values database 257 within relational database server 250. A 3D simulator input parameters database 259 may also be included within relational database server 250. Database 259 may include the fuel bundle positions and reactor operating parameters for all exposure steps. As the calculation servers 400 are operatively connected to, and may communicate with, relational database server 250, each of the subordinate databases described in FIG. 3 may be accessible to one or more calculation servers 400.

FIG. 4 is a flow chart illustrating the method in accordance with an exemplary embodiment of the invention. The method may be described in terms of a core loading pattern design for an exemplary boiling water reactor, it being understood that the exemplary embodiments may be applicable to PWRs, gas-cooled reactors and heavy-water reactors.

Referring to FIG. 4, a reactor plant is selected for evaluation (Step S5) and limits which are to be used for a simulation of a core of the selected plant that is to be loaded in accordance with a test core loading pattern are defined (Step S10). Based on the limits, an initial test core loading pattern may be determined and the "virtual" core may be loaded in accordance with the determined initial test core loading pattern design (Step S20). Reactor operation may be simulated (Step S30) on the entire core, or on a subset of the core, which may be a subset of fuel bundles in a reactor core for example, in order to produce a plurality of simulated results. The simulated results may be compared to the limits (Step S40), and based on the comparison, data may be provided illustrating whether any limits have been violated (Step S50). The data may provide the user with indications of which locations in a simulated core were the largest violators or largest contributors to a limit violation. Each of these steps is described in further detail below.

FIGS. 9–15 are screen shots describing an exemplary computer-based application to further illustrate various features of the method and arrangement of the present invention. These figures may be occasionally referred to in the following description.

Initially, a reactor plant is selected (Step S5) so that an initial test core loading pattern design may be chosen. The reactor plant may be selected from a stored list, such as is stored on an accessible database such as relational database 250, for example. The reactor to be evaluated may be any of a BWR, PWR, gas-cooled reactor or heavy water reactor, for example. Data from previously evaluated plants may be stored, and the plant listed under a suitable accessible folder such as may be accessed via a suitable input device (mouse, keyboard, plasma touch screen, voice-activated command, etc.) and GUI 230.

A set of limits applicable to the core may be defined (Step S10). These limits may be related to key aspects of the design of the particular reactor core being evaluated and design constraints of that reactor. The limits may be applicable to variables that are to be input for performing a simulation of a core loaded in accordance with a test core loading pattern design, for example, and may include constraints applicable only to the results of the simulation. For example, the input limits may be related to client-inputted reactor plant specific constraints and core performance criteria. Limits applicable to the simulation results may be related to one or more of operational parameter limits, and/or design constraints used for reactor operation, core safety limits, margins to these to these operational and safety limits and the other client-inputted reactor plant specific constraints. However, such limits or constraints are merely exemplary, as other limits or constraints, such as limits based on an up-rated core design that exceeds current operational limits, may be foreseeable.

FIG. 9 illustrates user or client-inputted plant specific constraints, which may be configured as limits on input variables to the simulation and limits on the simulation results. Referring to FIG. 9, there is listed a plurality of client-inputted plant specific constraints as indicated generally by the arrow 905. For each constraint, it is possible to assign a design value limit, as indicated by column 910.

FIG. 5 is a flowchart describing test core loading pattern selection and core loading in accordance with an exemplary embodiment of the invention. FIG. 5 is provided to explain determining step S20 in further detail.

The selection of a test core loading pattern, and loading of a "virtual" core for the selected plant based on the pattern, may be done in order to simulate reactor operation of the core design. Initially, a check is performed (Step S21) to establish whether prior iterations on a test core loading pattern have occurred. If this is a first iteration, e.g., no previous test core loading pattern has been analyzed, information on past cycles or similar plants may be used to provide a basis for an initial test core loading pattern estimate (Step S22). For example, an initial test core loading pattern may be selected from a core loading pattern design used for a similar core in a previous simulation, selected based on a core loading pattern design from a reactor that is similar to the reactor being evaluated, and/or from an actual core loading pattern design used in an earlier core energy cycle in the reactor plant being evaluated, for example.

If past iterations have been performed (the output of Step S21 is "NO") the total energy content of the core, using an established core loading pattern that conforms to the input limits, may be calculated, and a difference from a desired/required energy content may be defined (Step S23). This may also be done using a core loading pattern from Step S22, also accounting for the inputted limits, if this is the first iteration. This energy "delta" is the difference in the required energy for the next, future cycle as compared to the most recent End-of-Cycle (EOC). For additional iterations, the delta may be reduced as the difference between the actual energy and desired energy is reduced. Furthermore, negative delta energies imply that the resulting energy is greater than the desired energy and is desirable.

Typical rules of thumb exist that can help estimate the number of additional bundles needed (or number of bundles that must be removed) in order to obtain the desired target energy. The user should estimate (Step S24) the number of fresh fuel bundles necessary to make up for the energy difference. For example, in a BWR reactor with 764 bundles, it is commonly believed that four (4) bundles are worth approximately 100 MWD/st of cycle length. Therefore, if the resulting energy is over 100 MWD/st longer than the desired energy, four fresh bundles could be removed. Similarly, if the resulting energy more than 100 MWD/st shorter than the desired energy, four additional fresh bundles should be added.

After the number of fresh bundles, to be used in the test core loading pattern, is determined, core loading symmetry should be identified (Step S25). Some plants may require quadrant loading symmetry or half-core loading symmetry, for example. GUI 230 may be used to access a plant configuration webpage, which may enable the user to select a "model size", e.g., quarter core, half core, or full core, for evaluation in a subsequent simulation. Additionally, a user may select a core symmetry option (e.g., octant, quadrant, no symmetry) for the selected model size, by clicking on a suitable drop down menu and the like.

By selecting "octant symmetry", the user can model the reactor assuming that all eight (8) octants (where an octant is a group of fuel bundles for example) are similar to the modeled octant. Consequently, simulator time may be generally increased by a factor of eight. Similarly, by selecting "quadrant symmetry", the user can model the reactor assuming each of the four (4) quadrants are similar to the modeled quadrant. Hence, the simulator time may be generally increased by a factor of four. If asymmetries in bundle properties prevent octant or quadrant symmetry, the user can also specify no symmetry.

The "virtual" core may then be loaded (Step S26) in accordance with the initial test core loading pattern, accounting for symmetries and limits. The virtual core, loaded in accordance with the test core loading pattern, is ready to be simulated.

With the limits having been defined, the initial test core loading pattern design determined and the core loaded in accordance therewith, a simulation may be initiated (Step S30). The simulation may be executed by calculation servers 400; however, the simulation may be a 3D simulation process that is run external to the arrangement 1000. The user may employ well-known executable 3D simulator programs such as PANACEA, LOGOS, SIMULATE, POLCA, or any other known simulator software where the appropriate simulator drivers have been defined and coded, as is known. The calculation servers 400 may execute these simulator programs based on input by the user via GUI 230.

Thus, the user may initiate a 3D simulation at any time using GUI 230, and may have a number and different means to initiate a simulation. For example, the user may select a "run simulation" from a window drop down menu, or could click on a "RUN" icon on a webpage task bar, as is known. Additionally, the user may receive graphical updates or status of the simulation. Queue data related to the simulation may be queued in queue database 253 within relational database server 250. Once the simulation is queued, the user may have an audio and/or visual indication as to when the simulation is complete.

Figure 6:
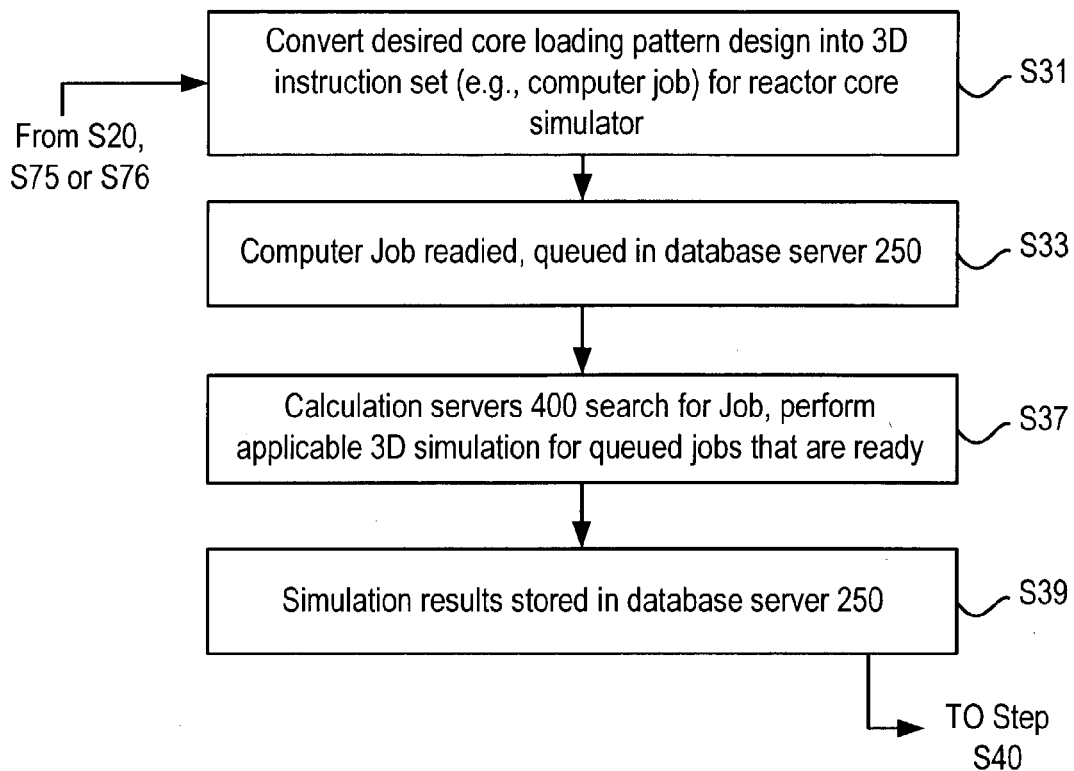
FIG. 6 is a flow chart illustrating a simulation step in accordance with an exemplary embodiment of the invention.

Once the user initiates simulation, many automation steps follow. FIG. 6 is a flow chart illustrating simulation Step S30 in further detail. Initially, definitions for the core loading pattern design problem may be converted into a 3D instruction set (e.g., a computer job) for the 3D reactor core simulator (Step S31). This enables the user to have a choice of several types of simulators, such as the simulators described above. Selection of a particular simulator may be dependant on the plant criteria entered by the user (e.g. the limits). The computer job may be readied for queuing in the queue database 253 of relational database server 250 (Step S33). The storing of the data for a particular simulation may enable any potential simulation iteration to begin from the last or previous iteration. By storing and retrieving this data, future simulation iterations to a core loading pattern design may take only minutes or seconds to perform.

Concurrently, a program running on each of the available calculation servers 400 scans every few seconds to look for available jobs to run (Step S37). If a job is ready to run, one or more of the calculation servers 400 obtains the data from the queue database 253 and runs the appropriate 3D simulator. As described above, one or more status messages may be displayed to the user. Upon completion of the simulation, simulator results may be stored in one or more subordinate databases within the relational database server 250 (e.g., simulation results database 255). Accordingly, the relational database server 250 may be accessed by the user, via GUI 230 and host processor 210, for example, in order to calculate objective function values for the test core loading pattern design.

Figure 7:
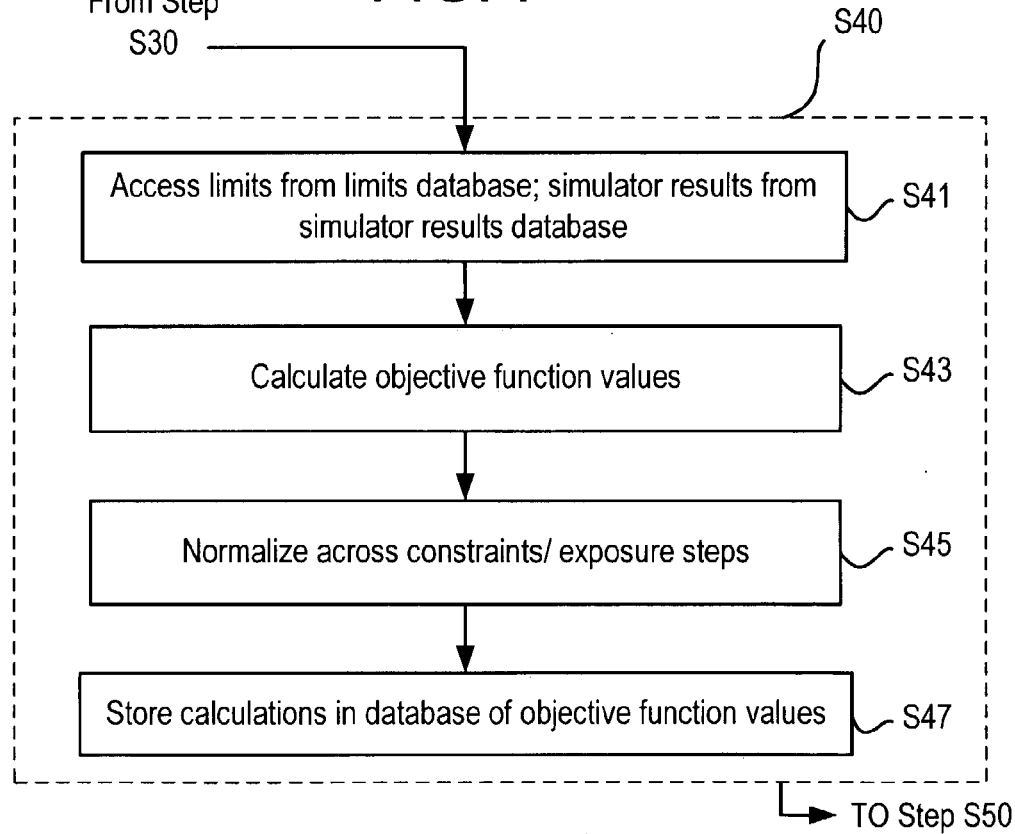
FIG. 7 is a flow chart illustrating the comparing step of FIG. 4 in more detail in accordance with an exemplary embodiment of the invention.

FIG. 7 is a flow diagram illustrating the comparing step of FIG. 4 in further detail. The objective function may be stored in relational database server 250 for access by calculation servers 400. Objective function calculations, which provide objective functions values, may also be stored in the relational database server 250, such as in a subordinate objective function value database 257. Referring to FIG. 7, inputs to the objective function calculation may include the limits from the limits database 257 and the simulator results from the simulator results database 255. Accordingly, one or more calculation servers 400 may access this data from relational database server 250 (Step S41).

Although the exemplary embodiments of the present invention envision any number of objection function formats that could be utilized, one embodiment may include an objective function having three components: (a) the limit for a particular constraint parameter (e.g., design constraint for reactor plant parameter), represented as "CONS"; the simulation result from the 3D simulator for that particular constraint parameter, represented as "RESULT", and a multiplier for the constraint parameter, represented by "MULT". A set of predefined MULTs may be empirically determined from a large collection of BWR plant configurations, for example. These multipliers may be set at values that enable reactor energy, reactivity limits, and thermal limits to be determined in an appropriate order. Accordingly, the method of the present invention utilizes a generic set of empirically-determined multipliers, which may be applied to over thirty different core designs. However, GUI 230 permits manual changing of the multipliers, which is significant in that user preference may desire certain constraints to be "penalized" with greater multipliers than the multipliers identified by the pre-set defaults.

An objective function value may be calculated for each individual constraint parameter, and for all constraint parameters as a whole, where all constraint parameters represent the entity of what is being evaluated in a particular test core loading pattern. An individual constraint component of the objective function may be calculated as described in Equation (1):

$$OBJ_{par}=MULT_{par}*(RESULT_{par}-CONS_{par});  \quad (1)$$

where "par" may be any of the client-inputted constraints listed in FIG. 9. It is to be understood that these parameters are not the only parameters that could be possible candidates for evaluation, but are parameters which are commonly used in order to determine a suitable core configuration for a nuclear reactor. The total objective function may be a summation of all constraint parameters, or $$OBJ_{TOT}=SUM(par=1,31)\{OBJ_{par}\} \quad (2)$$

Referring to Equation 1, if RESULT is less than CONS (e.g. there is no violation of a constraint), the difference is reset to zero and the objective function will be zero. Accordingly, objective function values of zero indicate that a particular constraint has not been violated. Positive values of the objective function represent violations that may require correction. Additionally, the simulation results may be provided in the form of special coordinates (i, j, k) and time coordinates (exposure step) (e.g., particular time in a core-energy cycle). Therefore, the user can see at which time coordinate (e.g., exposure step) the problem is located. Hence, the core loading pattern may be modified only at the identified exposure step.

In addition, objective function values may be calculated as a function of each exposure step, and totaled for the entire test core loading pattern design problem (Step S43). The objective function values calculated for each constraint, and the objective function values per exposure step, may be further examined by normalizing each objective function value to provide a percentage contribution of a given constraint to a total objective function value (Step S45). Each result or value of an objective function calculation is stored in a subordinate objective function value database 257 within relational database server 250.

The objective function values may be utilized in the manual determination of core loading pattern development. For example, the values of the objective function calculations may be viewed graphically by the user in order to determine parameters that violate limits. Additionally, any change in objective function values over successful iterations of core loading pattern designs provides the user with a gauge to estimate both improvement and detriment in their proposed core loading pattern design.

Increases in an objective function value over several iterations may indicate that the user's changes are creating a core loading pattern design that is moving away from a desired solution, while successive iterations of lesser objective functions values (e.g., the objective function value decreasing from a positive value towards zero) may indicate improvements in the iterative core loading pattern design. The objective function values, limits and simulation results over successive iterations may be stored in various subordinate databases within relational database server 250. Therefore, designs from past iterations may be quickly retrieved, should later modifications prove unhelpful.

Figure 10:
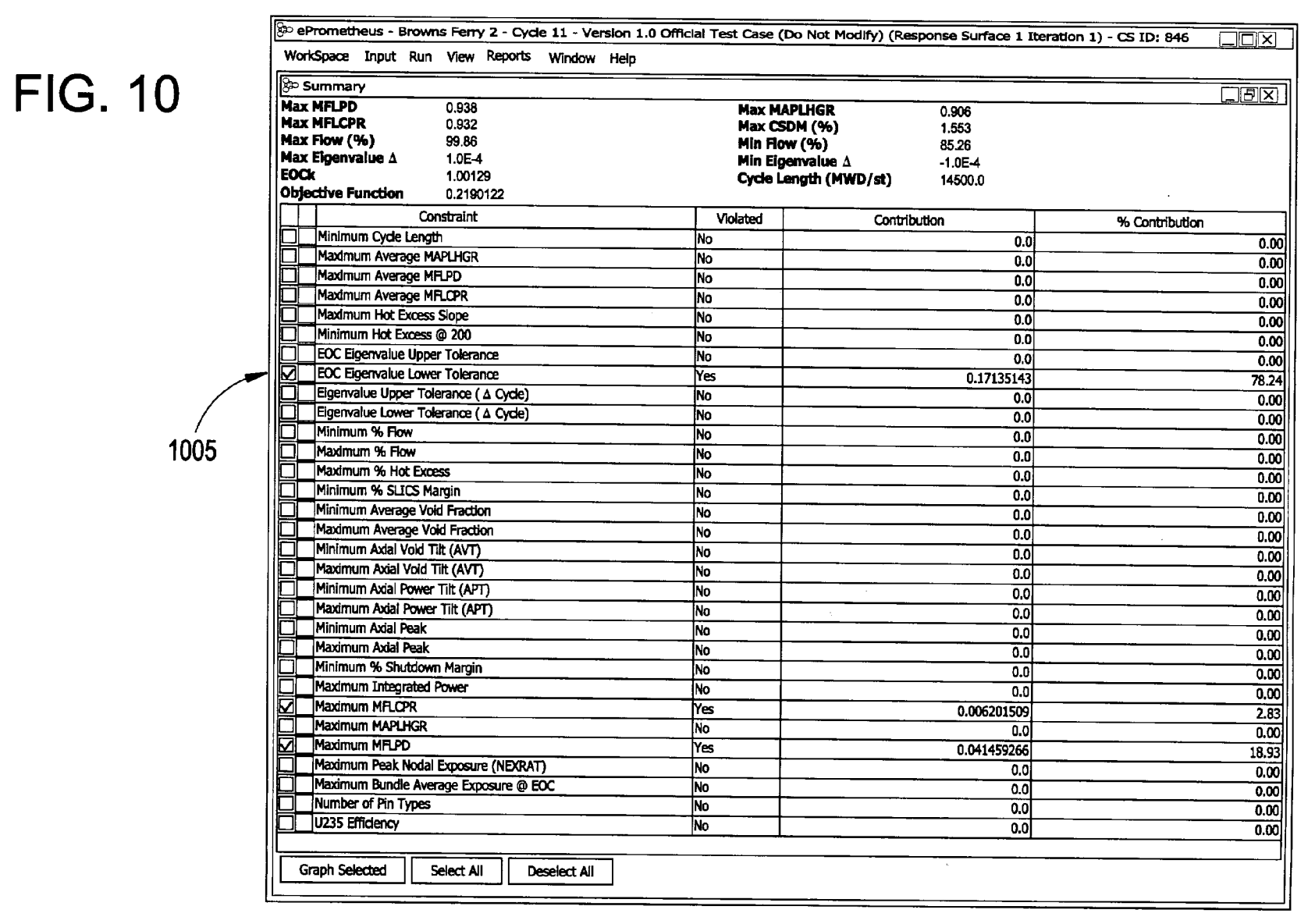

Upon completion of the objective function calculations, the user may be provided with data related to the objective function calculations, which may include limits that have been violated during the simulation of a core loaded based on the test core loading pattern design. FIG. 10 illustrates exemplary graphical data which a user may review. Referring to FIG. 10, there is displayed a list of constraint parameters which may represent the input limits, and the values of each of objective function value calculation on a per constraint basis. FIG. 10 illustrates limits which have been violated with a check in a box, as indicated by checked box 1005 for example. Additionally, for each limit violation, its contribution and percent (%) contribution (based on the calculations and the normalization routines described with respect to FIG. 7), may be displayed. Accordingly, based on this data, the user may be provided with recommendation(s) as to what modifications may need to be made to the test core loading pattern design for a subsequent iteration.

Although individual core loading pattern modifications may alternatively be left to the desires of the user, procedural recommendations may be provided in the form of a pull down menu, for example. These recommendations may be divided into three categories: energy beneficial moves, energy detrimental moves, and converting excessive margin (from thermal limit) into additional energy. A preferred technique may be to address problems using energy beneficial moves rather than energy detrimental moves although the exemplary embodiments are not limited to this preferred technique, as energy detrimental moves and/or converting excessive margin may be used to modify a particular test core loading pattern. Even if the core loading pattern design meets all of the limits (client-inputted plant specific constraints, design limits, thermal limits, etc.) the user may verify that any excessive margin to a particular limit is converted into additional energy. Accordingly, the following logic statements may illustrate the above procedural recommendations:

Energy Beneficial Moves

If Critical Power Ratio (CPR) margin too low towards core perimeter, move more reactive (less exposed) fuel toward core center If MFLPD (e.g., a thermal margin constraint) problem at EOC, move more reactive fuel towards problem location If shutdown margin (SDM) problem at core perimeter at BOC, place less reactive fuel toward core perimeter Energy Detrimental Moves If Minimum Critical Power Ratio (MCPR) margin too low at EOC, move less reactive (more exposed) fuel into problem location(s)

If KW/ft margin (MAPLHGR) too low at EOC, move less reactive fuel into problem location(s)

Converting Excessive Margin into Additional Energy

If extra MCPR margin in center of core at EOC, move more reactive fuel from core perimeter location to core center Based on the location, and on the time exposure of limit violations, as indicated by the objective function, a user may elect to follow one or more of the above recommendations to address and fix constraint violations.

The data resulting from the objective function calculations may be interpreted on a suitable display device. For example, this data may be displayed as a list of constraints with denoted violators, as described with respect to FIG. 10. However, the user may access a number of different "result" display screens that may configurable as 2- or 3-dimensional views, for example. The following Table 1 lists some of the exemplary views available to the user.

TABLE 1

GRAPHICAL VIEWS AVAILABLE TO USER

Figure 11:
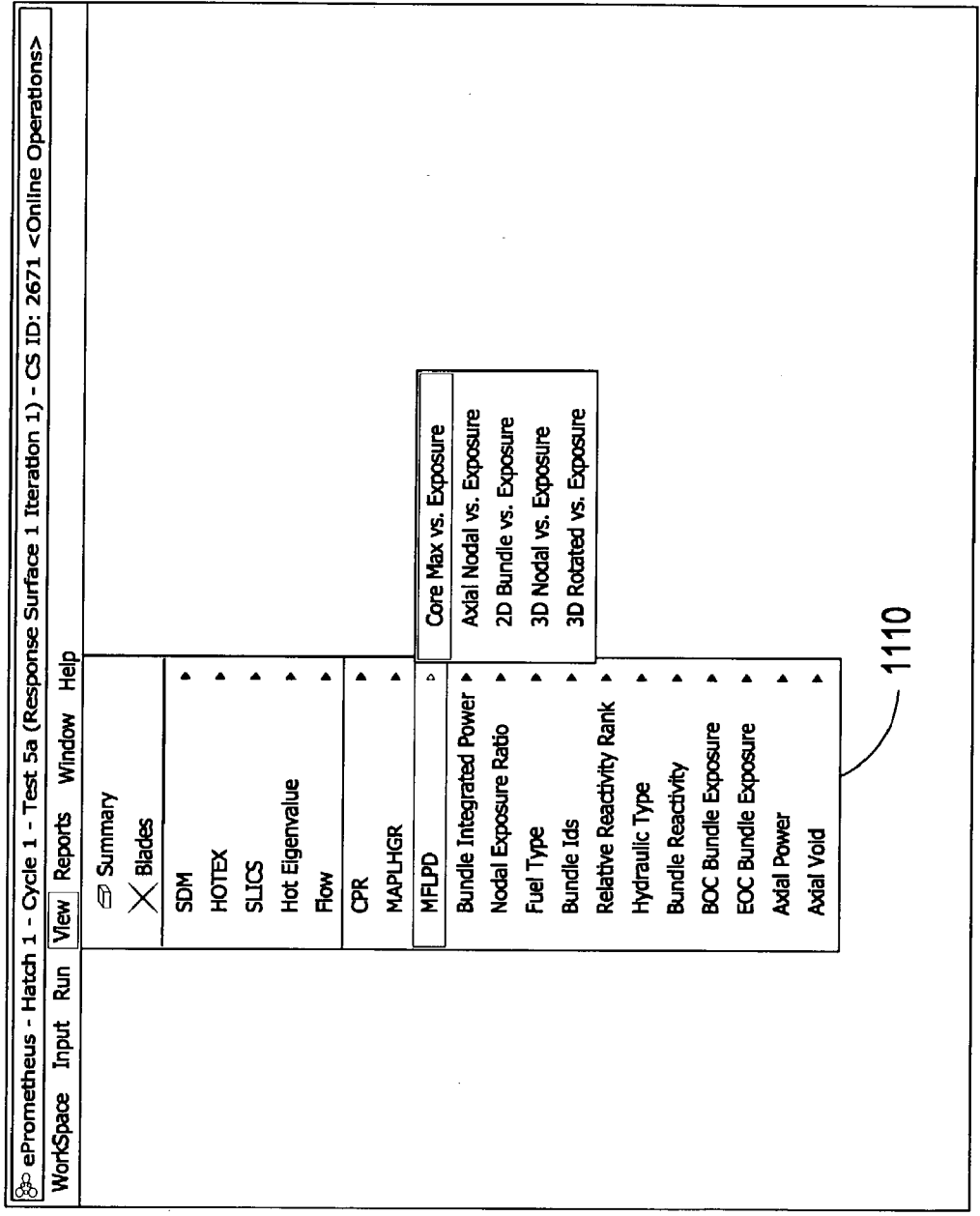
Figure 12A:
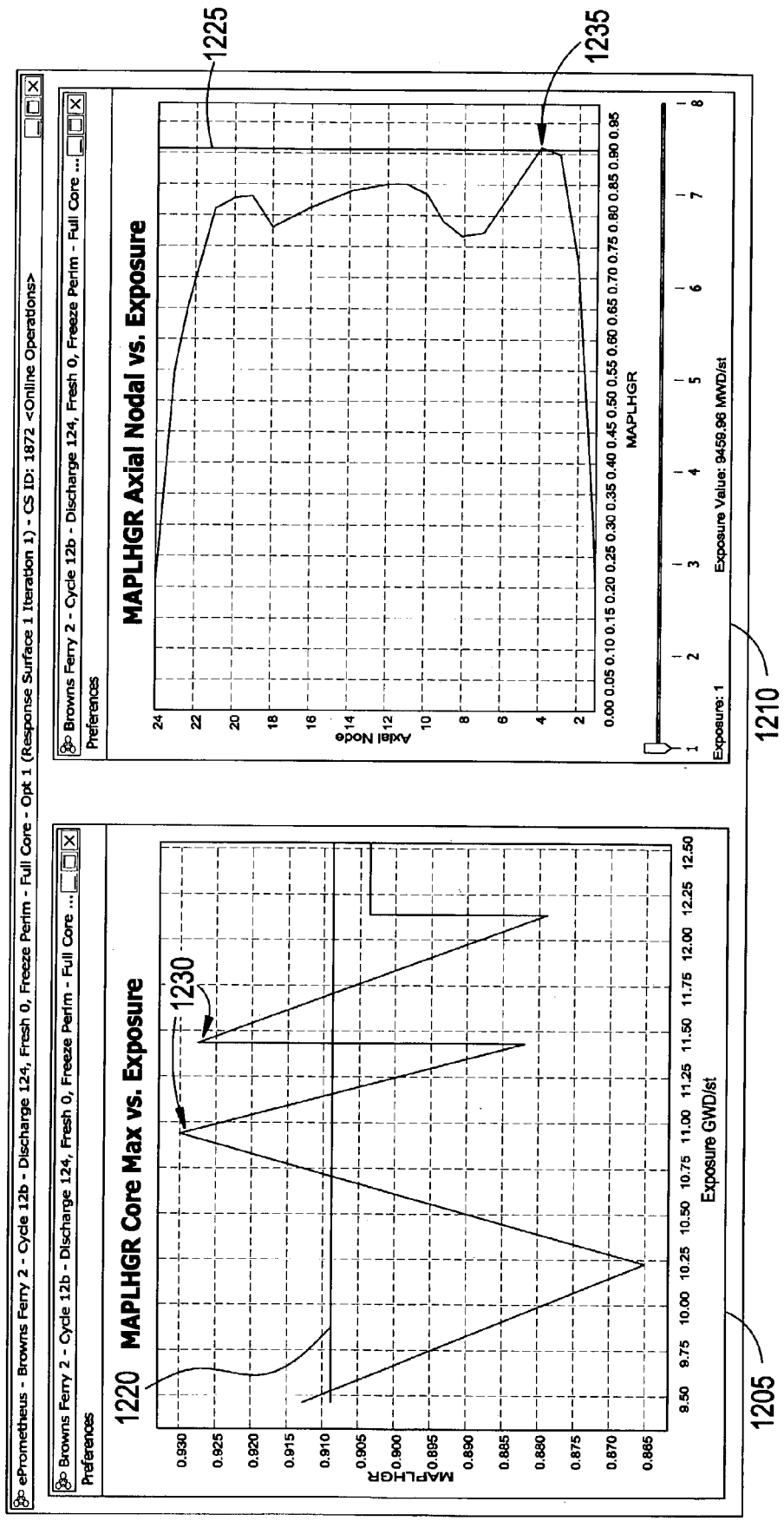
Figure 12B:
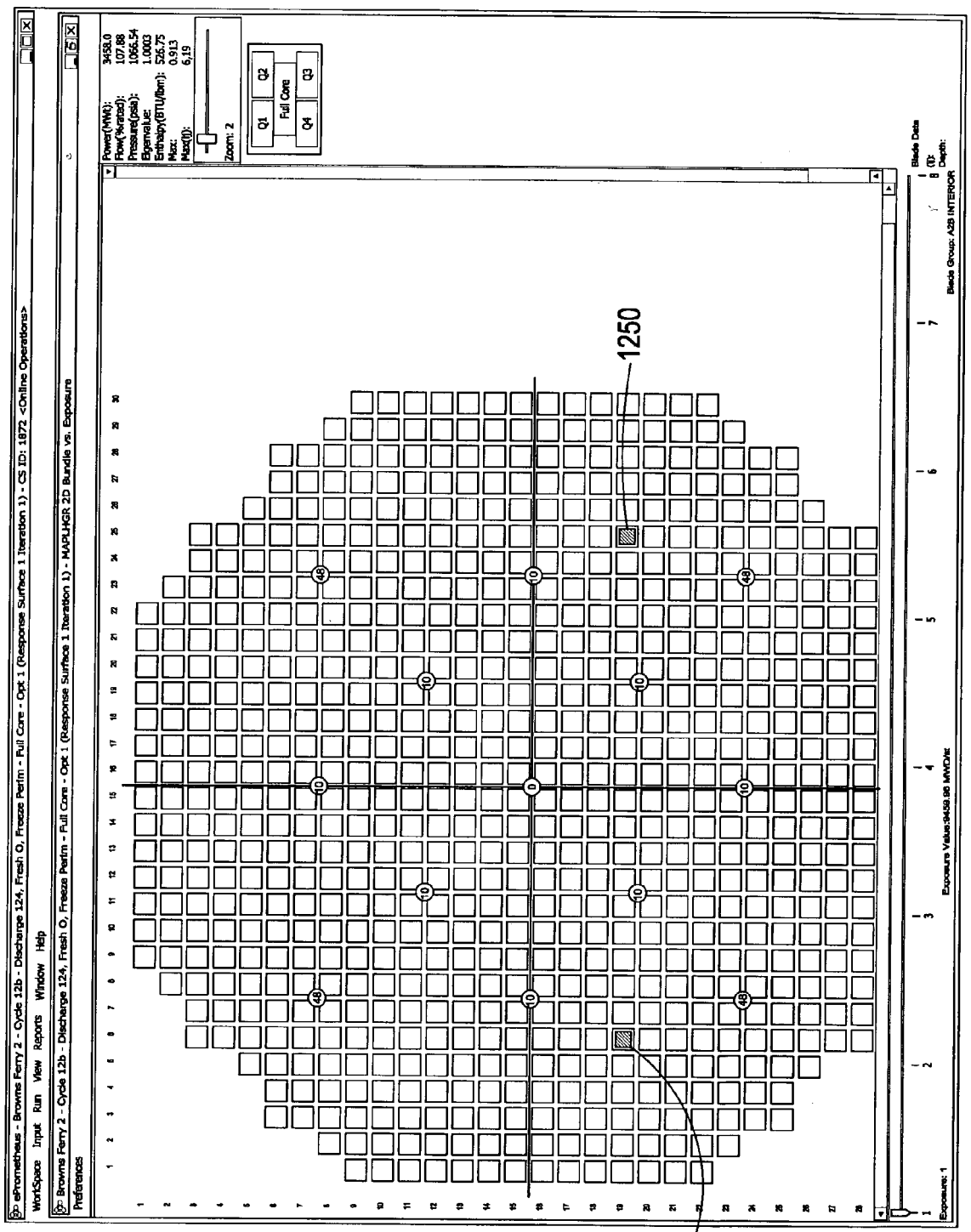

Objective function results - listing
Graph of max core value vs. exposure
Graph of nodal maximum value vs. exposure
Graph of location of max core value vs. exposure
Graph of pin value vs. exposure
Graph of bundle maximum value vs. exposure
View 3D rotational diagram
Report performance relative to previous iteration
Report improvement rates of various designers
Display of server status
Display of queue status
Display system recommendations FIGS. 11–12B illustrate graphical views available to the user in accordance with the invention. Referring to FIG. 11, a user may pull down a suitable drop down menu from a "view" icon on a task bar in order to display views of certain constraints or parameters. As illustrated in FIG. 11, a user has selected a Maximum Fractional Limiting Power Density (MFLPD) constraint parameter. There are a number of different graphical views available to the user, as indicated by pull-down menu 1110. The user simply selects the desired view and may then access a page such as is illustrated in FIGS. 12A or 12B. FIG. 12A illustrates two different 2-dimensional graphs of particular constraints, as seen at 1205 and 1210. For example, the user can determine where violations of Maximum Average Planar Heat Generation Rate (MAPLHGR) occur (in a core maximum vs. exposure graph 1205, and an axial values of MFLPD vs. exposure graph 1210) for a particular exposure in a core cycle. The limits for these constraints are shown by lines 1220 and 1225, with violations shown generally at 1230 and 1235 in FIG. 12A.

FIG. 12B illustrates another view, in this case a two dimensional view of an entire cross section of a core, in order to see where the biggest violation contributors for MAPLHGR vs. exposure are located. As can be seen at 1240 and 1250, the encircled squares represent the fuel bundles that are the largest violation contributors to MAPLHGR in the core (e.g., 1240 and 1250 pointing to bundles violating MAPLHGR). This gives the user an indication of locations in the test core loading pattern design that may need modification.

Figure 8A:
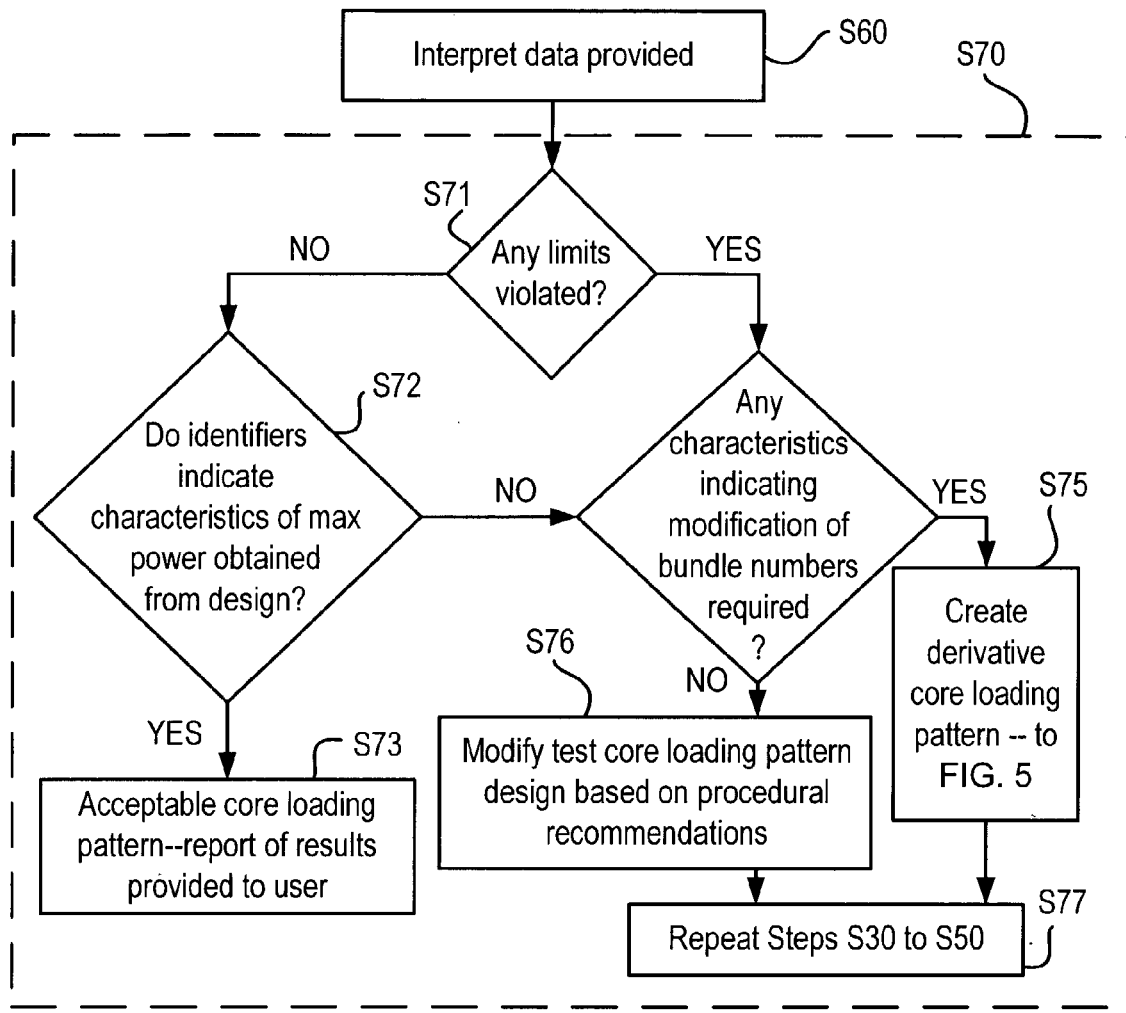
FIGS. 8A and 8B are flow charts illustrating the modification of a core loading pattern design and an iterative modification process in accordance with an exemplary embodiment of the invention.
Figure 8B:
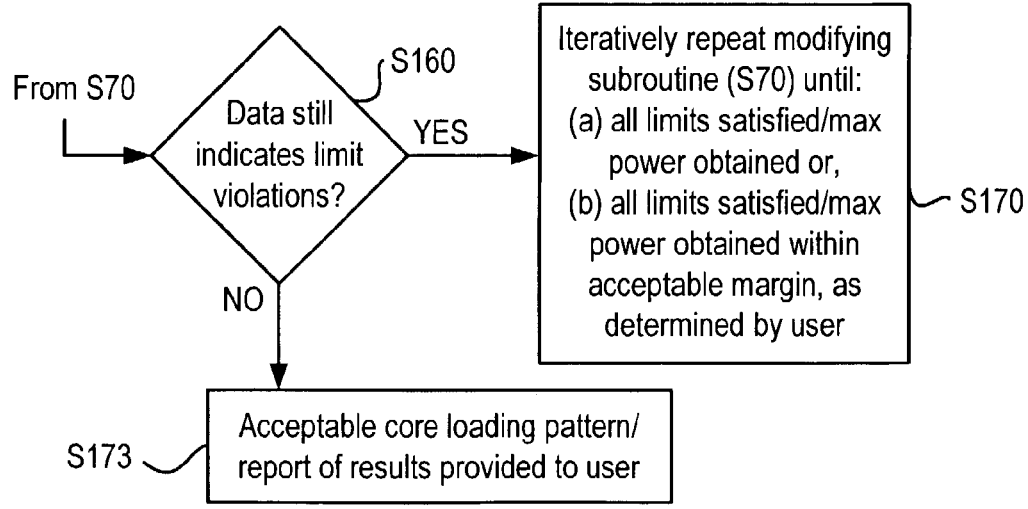

FIGS. 8A and 8B are flow diagrams describing modification and iteration processing steps in accordance with an exemplary embodiment of the invention. Referring to FIG. 8A, by interpreting the data at Step S60, the user may be inclined to initiate a modifying subroutine (Step S70). In all practicality, the initial test core loading pattern design will not be an acceptable design, and the modifying subroutine will be required. In an exemplary embodiment, the user may direct each iteration of this modifying subroutine, with the help of the graphical user GUI 230. In another exemplary embodiment, the modifying subroutine may be performed within the bounds of an optimization algorithm that automatically iterates simulation, calculation of objective function and evaluation of the results or values of the objective function calculations for a number of rod pattern design iterations.

The user determines, based on the displayed data, whether any limits are violated (Step S71). If no limits are violated, the user determines if any identifiers indicate that characteristics of maximum power are obtained from the core loading pattern design. For example, these identifiers may include an indication of good thermal margin utilization (such as margins on MFLCPR and MAPLHGR) by moving fuel toward the core center to maximize cycle extension. Power requirements may be shown to be met when the minimum EOC eigenvalue is obtained for the cycle design (eigenvalue search) or the desired cycle length is determined at a fixed EOC eigenvalue. If there is an indication that maximum power has been obtained from the test core loading pattern design (the output of Step S72 is YES), an acceptable core loading pattern design has been determined, and the user may access a report of results and data related to the accepted core loading pattern design (Step S73).

If limits are violated (the output of Step S71 is YES) or limits are not violated but there is an indication that maximum power has not been obtained from the core loading pattern design (the output Step S72 is NO) then the user determines whether any characteristics indicate that modification of bundle numbers is required (Step S74). Characteristics that indicate a need to modify the fresh fuel bundle number may include an energy shortfall, a margin shortfall with acceptable energy, and/or a loss of reactivity due to outage date changes. Additionally, if several iterations of core loading pattern design changes have been attempted and there has been no real improvement to the objective function, this is a further indication that an alternative core loading pattern design might need to be explored.

Accordingly, if the output of Step S74 is YES, the user may create a modified or derivative core loading pattern design by re-estimating the number of fresh fuel bundles needed, rounding bundle numbers down as required for core symmetry and loading the core according to the revised or derivative test core loading pattern (Step S75). Step S75 generally corresponds to steps S24–S26 in FIG. 5.

If there are no characteristics indicating a need to modify the fresh fuel bundle number (the output of Step S74 is NO) the user may modify the test core loading pattern design (Step S76) to create a derivative pattern. In making a modification to the test core loading pattern based on the procedural recommendations described above, the user may alter the core loading via the GUI 230. For example, and using a suitable input device (mouse, keyboard, touch screen, voice command, etc) and GUI 230, a designer may identify the core symmetry option for any fuel bundle(s) in the core design that the user desires to move, may select these "target" fuel bundle(s), and may selected the "destination" fuel bundles in the current core design for replacement by the target bundle(s). The target and destination bundles may be "shuffled" according to the required symmetry (mirror, rotational, etc.). This process may be repeated for any fuel bundle shuffle that is required to re-load a new, modified test core loading pattern in the desired manner.

Figure 13:
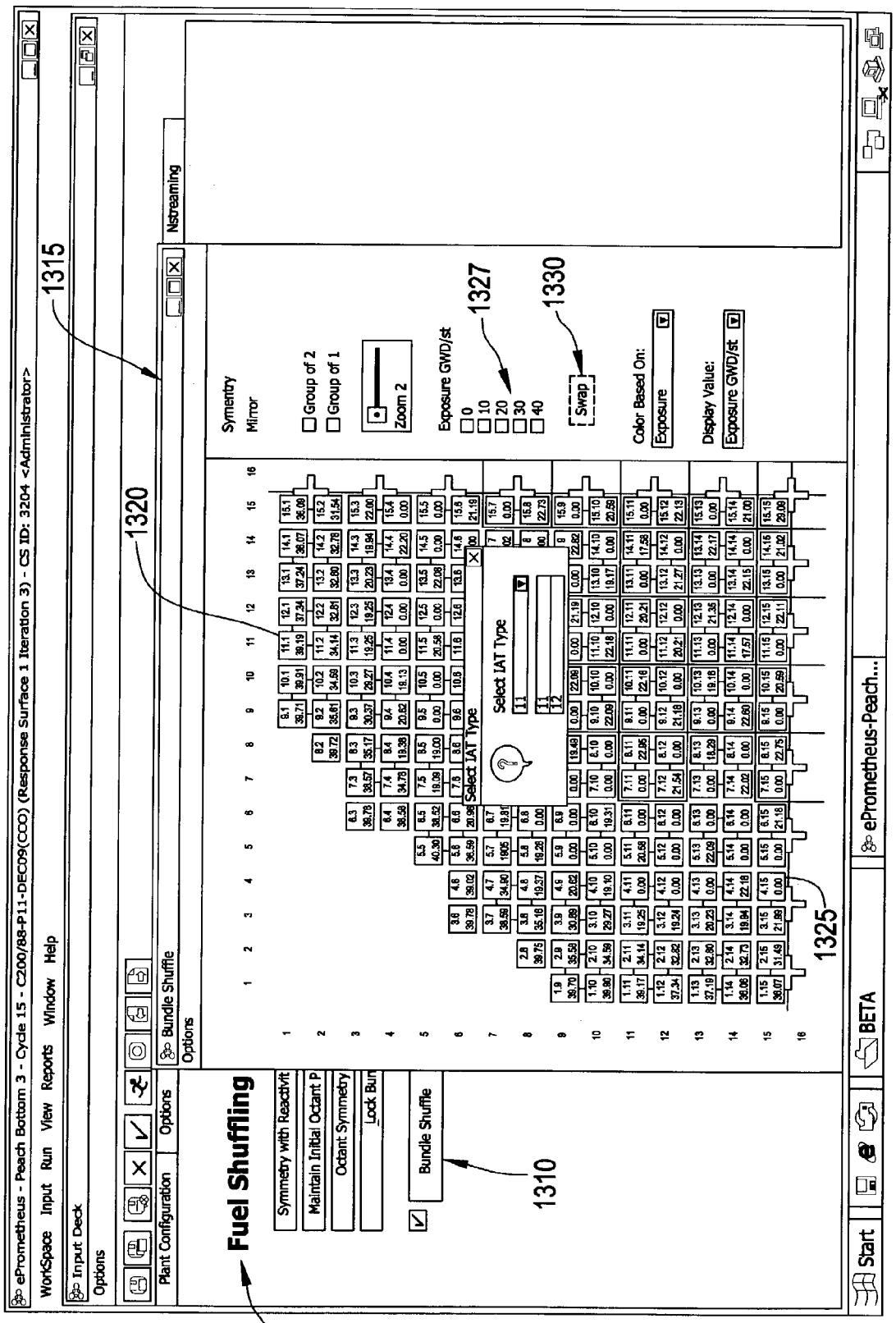

FIG. 13 is a screen shot illustrating the modifying Step S76 in further detail in accordance with an exemplary embodiment of the invention. FIG. 13 illustrates the functionality available to the user so as make swift design modifications to a core loading pattern design. A user may select a fuel shuffling page 1305 and may select a "bundle shuffle" taskbar 1310 in order to display a screen 1315 of a portion of a core design. In FIG. 13, a fuel bundle designated at 1320 is being changed from one fuel bundle type (IAT type 11) to another (IAT type 12). An exposed bundle may be swapped with a fresh fuel bundle by selecting a fresh fuel bundle in the core design, the exposed fuel bundle, and selecting the "SWAP" button 1330. The portion of the core shown in screen 1315 may be color coded to show the various exposures (GWD/st) of each of the fuel bundles. A corresponding color coded key may be displayed as indicated at 1327 for example. Selection of items in FIG. 13 may be effected by use of a suitable input device, such as a mouse, keyboard, touch screen, voice-activated command, etc.

These core loading pattern design modifications may be saved in relational database 250, such as in 3D Simulator input parameters database 259, for example. Referring again to FIG. 8A, regardless of whether the test core loading pattern was modified as described Steps S75 or S76, Steps S30–S50 may be repeated to determine if the derivative rod pattern design meets all limits (Step S77). This may become an iterative process.

FIG. 8B illustrates an iterative process in accordance with an exemplary embodiment of the invention. For each derivative core loading pattern design from Step S70 that has been simulated, the user determines whether any data that is related to the comparison between simulated results and limits (e.g., the calculated objective function values) still indicates that there are limit violations (Step S160). If not, (output of Step S160 is NO) the user has developed an acceptable core loading pattern design that may be used in a particular reactor, and may access graphical results related to the acceptable core loading pattern design (Step S173).

If an iteration still indicates that limits are violated (the output of Step S160 is YES) then the modifying subroutine in Step S70 may be iteratively repeated until all limits are satisfied/maximum power obtained, or until all limits are satisfied/-maximum power obtained within a margin that is acceptable, as determined by the user (Step S170). The iterative process may be beneficial in that it enables the user to fine tune a core loading pattern design, and to perhaps extract even more energy out of an acceptable core loading pattern design than was previously possible of doing with the conventional, manual iterative process. Further, incorporation of the relational database server 250 and a number of calculation servers 400 expedite calculations. The iterative process as described in FIG. 8B may be done in an extremely short period of time, as compared to a number of weeks using the prior art manual iterative process of changing one parameter at a time, and then running a reactor core simulation.

To this point, the exemplary embodiments of the present invention have been described in terms of a user or designer interpreting data via GUI 230 and modifying a test core loading pattern design iteratively, by hand, using the assisted computational power of a host processor 210 and/or calculation servers 400 in order to get a desired design. However, the aforementioned steps of FIGS. 8A and 8B may also be effectuated by way of an optimization process. The optimization process may iterate the steps in FIGS. 8A and 8B over N different core loading pattern designs, in an effort to consistently improve toward a desired core loading pattern design that satisfies all user limits and constraints, for use in a nuclear reactor core.

Figure 14:
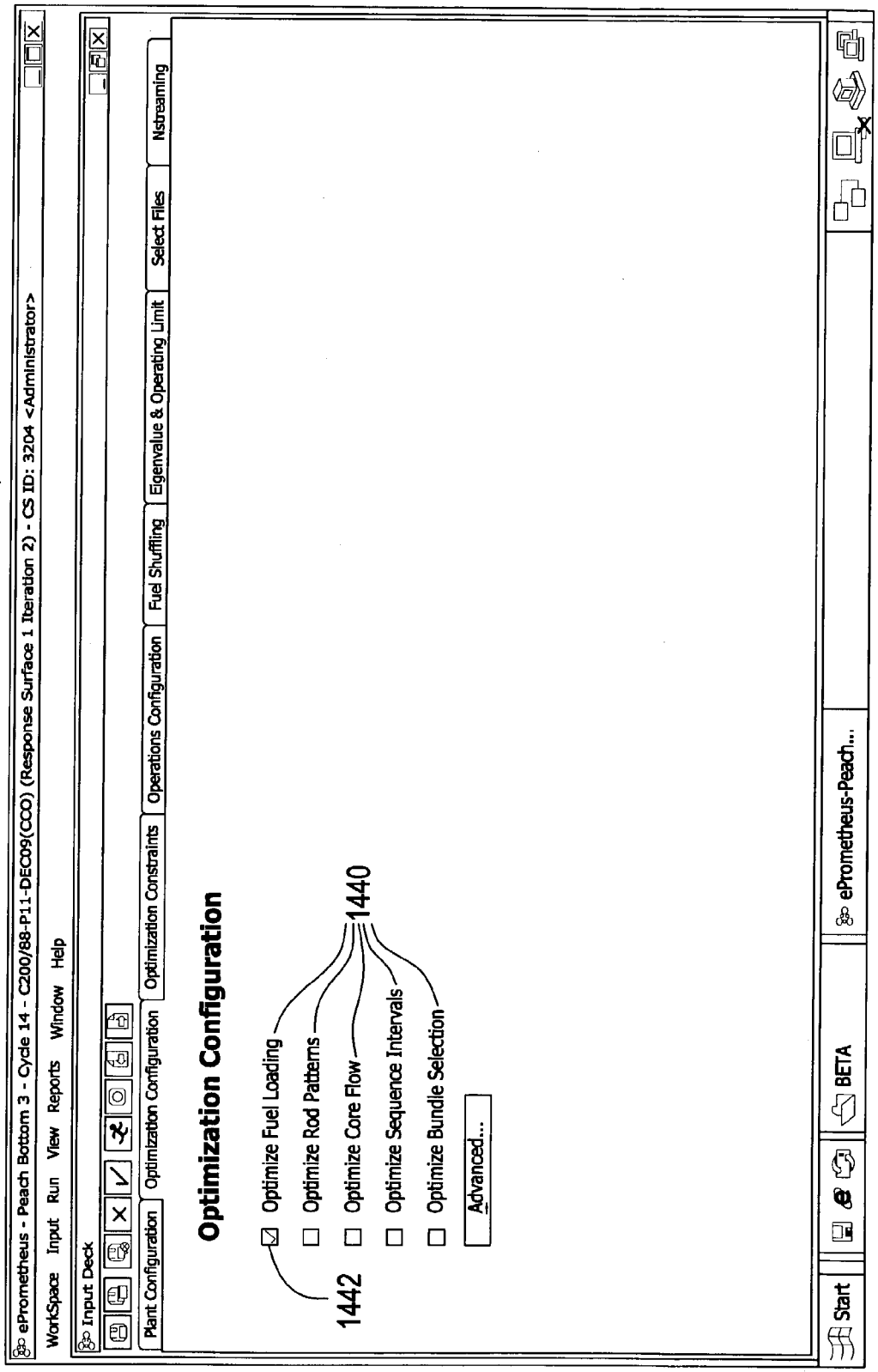

FIG. 14 illustrates a screen shot to initiate such a process. For example, after selecting the plant and generating a test core loading pattern design, the user may display an optimization configuration screen 1405. The user may select optimization parameters 1440 of optimize fuel loading, optimize rod patterns, optimize core flow, optimize sequence intervals and optimize bundle selection, for example.

Optimize bundle selection means making an optimal determination of fresh bundle types within the reference core design. As a result of the optimization, each fresh location may contain any one of a number of bundle types (e.g., IAT types as shown in FIG. 13, for example). These types may be selected to maximize energy while satisfying constraints, as described above. Optimize fuel loading selection means making an optimal determination of the once and twice burnt fuel.

Optimize rod patterns means to make an optimal determination on control blade (or control rod if PWR) position. Rod positions affect the local power as well as the nuclear reaction rate. Optimize core flow means making an optimal determination of reactor coolant flow rate through the reactor as a function of time during the operating cycle. Flow rate affects global reactor power as well as the nuclear reaction rate. Optimize sequence intervals means making an optimal determination of the time duration a given sequence (i.e., control rod grouping) is used to control the reactor during the operating cycle. Sequence intervals affect local power as well as the nuclear reaction rate.

Using a suitable input device (e.g., keyboard, mouse, touch display, etc.), the user may select, via GUI 230, one or more of the optimization parameters by clicking in the selection box 1442 associated with an optimization parameter 1440. When selected, a check appears in the selection box 1442 of the selected optimization parameter. Clicking in the selection box 1442 again de-selects the optimization parameter. For example, to perform an optimization for a test core loading pattern, a user would select the optimize fuel loading box 1442, as illustrated in FIG. 14.

Memory (relational database server) 250 may also store constraint parameters associated with the optimization problem. These may be stored in limits database 251 for example. The constraint parameters are parameters of the optimization problem that must or should satisfy a constraint or constraints, where a constraint may be analogous to the limits described above.

FIG. 15 illustrates a screen shot of an exemplary optimization constraints page listing optimization constraints associated with an optimization problem of boiler water reactor core design. As shown, each optimization constraint 1550 has a design value 1552 associated therewith. Each optimization constraint must fall below the specified design value. The user has the ability to select optimization parameters for consideration in configuring the objective function. The user selects an optimization constraint by clicking in the selection box 1554 associated with an optimization constraint 1550. When selected, a check appears in the selection box 1554 of the selected optimization constraint 1550. Clicking in the selection box 1554 again de-selects the optimization constraint.

Each optimization parameter may have a predetermined credit term and credit weight associated therewith stored in relational database server 250. Similarly, each optimization constraint has a predetermined penalty term and penalty weight associated therewith, which may be stored in relational database server 250, such as in limits database 251 and/or objective function values database 257. As seen in FIG. 15, the penalty term incorporates the design value (limit or constraint), and the user can change (i.e., configure) this value as desired. Additionally, the embodiment of FIG. 15 allows the user to set an importance 1556 for each optimization constraint 1550. In the importance field 1558 for an optimization constraint, the user may have pull down options of minute, low, nominal, high and extreme. Each option correlates to an empirically predetermined penalty weight such that the greater the importance, the greater the predetermined penalty weight. In this manner, the user selects from among a set of predetermined penalty weights.

Once the above selections have been completed, a calculation server 400 retrieves the selections above from relational database server 250 and configures the objective function according to the generic definition discussed above and the selections made during the selection process. The resulting configured objective function equals the sum of credit components associated with the selected optimization parameters plus the sum of penalty components associated with the selected optimization constraints.

Additionally, this embodiment provides for the user to select a method of handling the credit and penalty weights. For example, the user is supplied with the possible methodologies of static, death penalty, dynamic, and adaptive for the penalty weights; is supplied with the possible methodologies of static, dynamic and adaptive for the credit weights; and the methodology of relative adaptive for both the penalty and credit weights. The well-known static methodology maintains the weights at their initially set values. The well-known death methodology sets each penalty weight to infinity. The well-known dynamic methodology adjusts the initial weight value during the course of the objective function's use in an optimization search based on a mathematical expression that determines the amount and/or frequency of the weight change. The well-known adaptive methodology is also applied during the course of an optimization search. In this method, penalty weight values are adjusted periodically for each constraint parameter that violates the design value. The relative adaptive methodology is disclosed in co-pending and commonly assigned U.S. patent application Ser. No. 10/246,718, entitled METHOD AND APPARATUS FOR ADAPTIVELY DETERMINING WEIGHT FACTORS WITHIN THE CONTEXT OF AN OBJECTIVE FUNCTION, filed on Sep. 19, 2002.

Optimization Using the Objective Function

Figure 16:
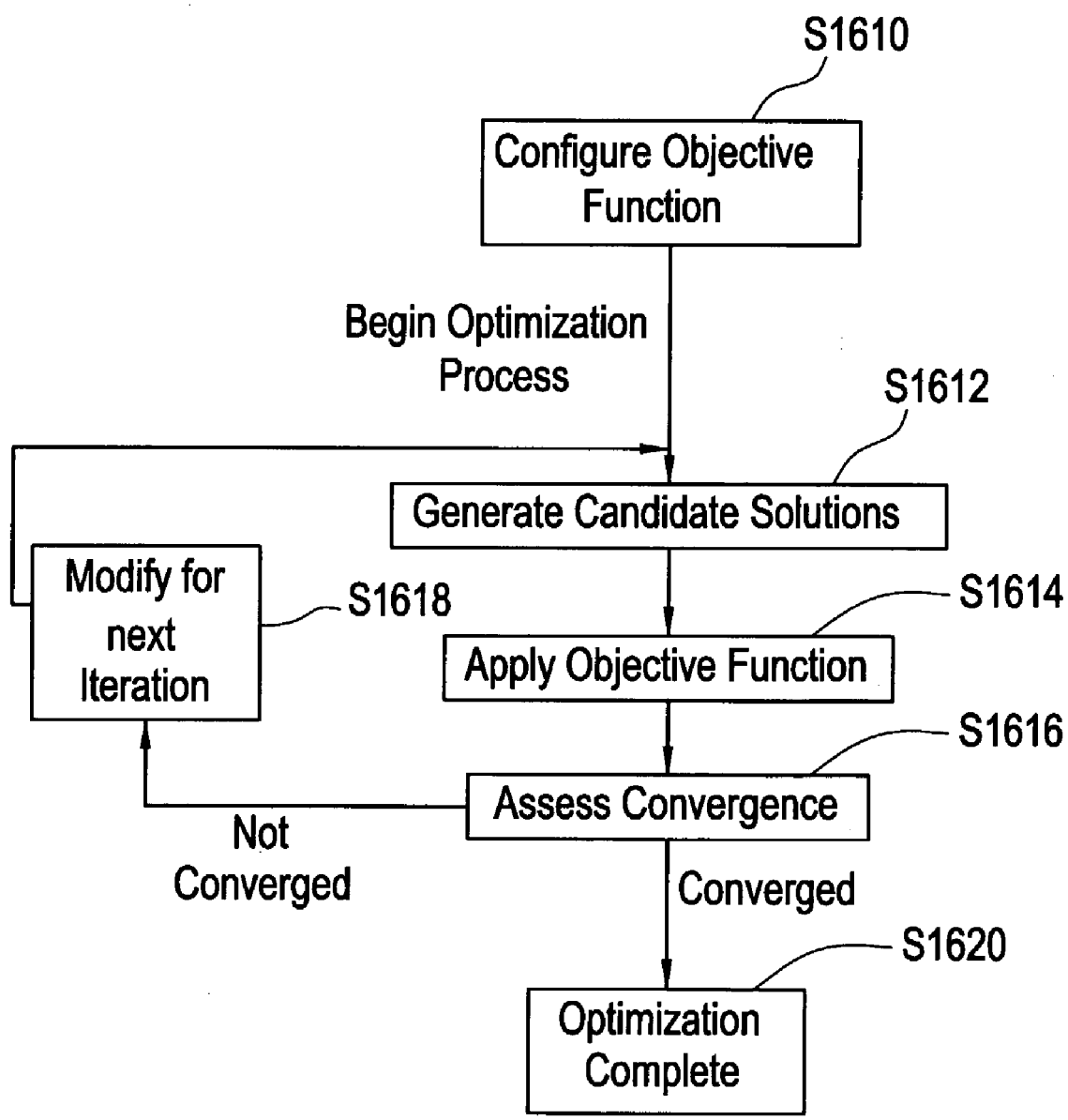
FIG. 16 is a flow chart describing an optimization routine used in accordance with an exemplary embodiment of the invention.

FIG. 16 illustrates a flow chart of an optimization process employing the objective function in accordance with an exemplary embodiment of the present invention. This optimization process is disclosed in U.S. patent application Ser. No. 10/246,716, entitled METHOD AND APPARATUS FOR EVALUATING A PROPOSED SOLUTION TO A CONSTRAINT PROBLEM, by the inventors of the subject application, filed on Sep. 19, 2002.

For the purposes of explanation only, the optimization process of FIG. 16 will be described as being implemented by the architecture illustrated in FIG. 1. As shown, in Step S1610 the objective function is configured as discussed above in the preceding section, then the optimization process begins. In Step S1612, the calculation processors 400 retrieve system inputs from relational database 250, or generate one or more sets of values for input parameters (i.e., system inputs) of the optimization problem based on the optimization algorithm in use. For example, these input parameters may be related to determining fresh and exposed fuel bundles within the reactor, and/or a core loading pattern design with initial fresh fuel loading pattern for a next energy cycle of a particular nuclear reactor plant. However, optimization is not limited to using these parameters, as other input parameters might be selection of the rod groups (sequences) and placement of the control rod positions within the groups as a function of time during the cycle, core flow as a function of time during a cycle, reactor coolant inlet pressure, etc.

Each input parameter set of values is a candidate solution of the optimization problem. The core simulator as described above runs a simulated operation and generates a simulation result for each input parameter set of values. The simulation result includes values (i.e., system outputs) for the optimization parameters and optimization constraints. These values, or a subset of these values, are values of the variables in the mathematical expressions of the objective function.

Then, in step S1614, a calculation processor 400 may use the objective function and the system outputs to generate an objective function value for each candidate solution. In step S 1616, the calculation processor 400 assesses whether the optimization process has converged upon a solution using the objective function values generated in step S1614. If no convergence is reached, then in step S1618, the input parameter sets are modified, the optimization iteration count is increased and processing returns to step S1612. The generation, convergence assessment and modification operations of steps S1612, S1616 and S1618 are performed according to any well-known deterministic optimization algorithm such as Steepest Descent, Genetic Algorithms, Simulated Annealing, and Tabu Search. When the optimization is utilized to determine an acceptable core loading pattern design, the optimization may be run until convergence (e.g., acceptable results as in steps S73/S173 of FIGS. 8A and 8B) is obtained.

The technical effect of the invention may be a computer-based arrangement that provides a way to efficiently develop a core loading pattern design for a nuclear reactor, as well as a computer-based method for providing internal and external users the ability to quickly develop, simulate, modify and perfect a core loading pattern design for existing fuel within, and fresh fuel assemblies that are to be loaded within, a core of a nuclear reactor at a next scheduled outage.

The exemplary embodiments of the present invention being thus described, it will be obvious that the same may be varied in many ways. Such variations are not to be regarded as a departure from the spirit and scope of the exemplary embodiments of the invention, and all such modifications as would be obvious to one skilled in the art intended to be included within the scope of the following claims.

What is claimed:

1. A computer implemented method of developing a core loading pattern design for a nuclear reactor, comprising:
    defining a set of limits applicable to a core of the nuclear reactor;
    determining a test core loading pattern design to be used for loading the core based on the limits;
    simulating reactor operation of the core loaded in accordance with the test core loading pattern design core to produce a plurality of simulated results;
    comparing the simulated results against the limits; and
    providing data indicative of limits that were violated by the core during the simulation and procedural recommendations for modifying the test core loading pattern design based on limit violations for display to a user.

2. The method of claim 1, further comprising: storing information related to the test core loading pattern design, limits, simulated results and data from the comparison.

3. The method of claim 1, wherein the defining step further includes:
    defining input limits applicable to variables that are to be input for performing the simulating step; and
    defining result limits applicable to the simulated results, wherein the input limits and result limits are evaluated in the comparing step.

4. The method of claim 3, wherein the input limits are related to client-inputted plant specific constraints and core performance criteria.

5. The method of claim 3, wherein the result limits are related to at least one of operational parameter limits used for reactor operation, core safety limits, margins to those operational and safety limits and client-inputted plant specific constraints.

6. The method of claim 1, wherein the comparing step further comprises:
    configuring an objective function to evaluate the simulated results; and
    generating objective function values for each simulated result using the objective function; and
    evaluating the objective function values based on the defined set of limits to determine which of the simulated results violate a limit.

7. The method of claim 1, wherein the providing step further comprises providing data related to an acceptable core loading pattern design, if the comparing step indicates that all limits have been satisfied, or satisfied within an acceptable margin.

8. The method of claim 1, further comprising:
    modifying the test core loading pattern design to create a derivative core loading pattern design; and
    repeating the simulating, comparing and providing steps to develop data indicating limits that were violated by the derivative core loading pattern design during the simulation.

9. The method of claim 8, further comprising:
    iteratively repeating the modifying, simulating, comparing and providing steps to develop N iterations of the derivative core loading pattern design, and, for selected ones of the N iterations,
    storing information related to the core loading pattern design, limits, simulated results and data from the comparison.

10. The method of claim 9, wherein the iteratively repeating step is performed until the comparing in a particular iteration indicates that all limits have been satisfied, or satisfied within an acceptable margin, the method further comprising:
    outputting data related to an acceptable core loading pattern design for the nuclear reactor.

11. The method of claim 1, further comprising;
    selecting a type of nuclear reactor, wherein the reactor is selected from a group comprising a boiling water reactor, a pressurized water reactor, a gas-cooled reactor and a heavy water reactor.

12. The method of claim 1, wherein the procedural recommendations for modifying the test core loading pattern design include procedural recommendations for making energy beneficial modifications in the test core loading pattern design, energy detrimental modifications in the test core loading pattern design, and modifications converting any excessive margin from a given limit into additional energy test core loading pattern design.

13. An arrangement for developing a core loading pattern design for a nuclear reactor, comprising:
    an interface receiving a set of limits applicable to a core of the nuclear reactor;
    a memory storing said set of limits;
    a processor determining a test core loading pattern design to be used for loading the core based on the limits;
    a simulator simulating reactor operation of the core loaded in accordance with the test core loading pattern design to produce a plurality of simulated results, the processor comparing the simulated results against the limits, and the interface providing data for display to a user indicating one or more limits that were violated by the core during the simulation, wherein the processor provides procedural recommendations for display to the user based on limit violations, via the interface, for modifying the test core loading pattern design.

14. The arrangement of claim 13, wherein the memory is further configured to store information related to the test core loading pattern design, limits, simulated results and data from the comparison, the memory accessible by at least one of the processor, simulator and a user communicating with at least one of the processor and simulator via the interface.

15. The arrangement of claim 13, wherein the interface is a graphical user interface (GUI) which communicates with a user over one of an internet or intranet.

16. The arrangement of claim 15, wherein the user is at least one of a client communicating with the GUI to generate a desired plant-specific core loading pattern design for the client's nuclear reactor, and a designer using the arrangement to provide a desired plant-specific core loading pattern design for the client's nuclear reactor.

17. The arrangement of claim 15, wherein the user enters the limits via the GUI, the limits are related to plant-specific core performance parameters and plant-specific constraints on operational reactor parameters.

18. The arrangement of claim 14, wherein
the memory further stores an objective function that is based on a generic objective function definition being a sum of a first number of credit terms plus a sum of a second number of penalty terms, the limits received by the interface includes credit term variables related to credit terms of the objective function and penalty term variables related to penalty terms of the objective function, and the processor, based on the credit term variables and penalty term variables, evaluates the simulated results using the objective function to generate an objective function value for each simulated result.

19. The arrangement of claim 13, wherein, in response to data indicating the violation of one or more limits, the interface receives a command modifying the test core loading pattern design to create a derivative core loading pattern design;

the simulator repeats the simulation on the derivative core loading pattern design the processor compares the simulated results against the limits, and the interface provides data indicating limits that were violated by the derivative core loading pattern design during the simulation.

20. The arrangement of claim 19, wherein, in response to data for every Nth derivative core loading pattern design indicating the violation of one or more limits, the interface, simulator and processor perform N iterations of core loading pattern design modification, simulation, comparison and data providing functions, and, for selected ones of the N iterations, the memory stores information related to core loading pattern design, limits, simulated results and data from the comparison.

21. The arrangement of claim 20, wherein
the interface, simulator and processor perform said N iterations until the processor determines, in a particular iteration, that all limits have been satisfied, or satisfied within an acceptable margin, and the interface outputs data related to an acceptable core loading pattern design for the nuclear reactor.

22. A computer implemented method of determining a core loading pattern design for a nuclear reactor, comprising:

receiving a set of limits input by a user that are applicable to a core of the nuclear reactor that is loaded in accordance with a test core loading pattern design;

simulating reactor operation on the core to produce a plurality of simulated results;

comparing the simulated results against the limits;

displaying data indicative of limits that were violated by the core during the simulation and procedural recommendations for modifying the test core loading pattern design based on limit violations for review by the user, and modifying the test core loading pattern design based on one or both of the displayed data and procedural recommendations to create a derivative core loading pattern design, unless all limits have been satisfied, or satisfied within a margin that is acceptable to the user.

23. The method of claim 22, further comprising:
storing information related to the test core loading pattern design, limits, simulated results and data from the comparison.

24. The method of claim 22, further comprising:
iteratively repeating the simulating, comparing, displaying and modifying steps to develop N iterations of the derivative core loading pattern design until the comparing in a particular iteration indicates that all limits have been satisfied, or satisfied within an acceptable margin; and outputting data related to an acceptable core loading pattern design for the nuclear reactor for display to the user.

25. A computer program product comprising a computer-readable storage medium having computer program logic stored thereon for enabling a processor to develop a core loading pattern design for a nuclear reactor, the computer program logic when executed on a computer causing the processor to perform the steps of:

defining a set of limits applicable to a core of the nuclear reactor;

determining a test core loading pattern design to be used for loading the core based on the limits;

simulating reactor operation on at least a subset of the core to produce a plurality of simulated results;

comparing the simulated results against the limits;

providing data for display to a user indicative of limits that were violated by the core loaded with the test core loading pattern during the simulation;

determining procedural recommendations for modifying the test core loading pattern design, based on violation of one or more of the limits; and displaying data indicative of limits that were violated and the procedural recommendations to the user via a graphical user interface.

26. The computer program product of claim 25, the computer program logic causing the processor to direct storing of information related to the test core loading pattern design, limits, simulated results and data from the comparison in a memory.

27. The arrangement of claim 13, wherein the procedural recommendations include procedural recommendations for making energy beneficial modifications in the test core loading pattern design, energy detrimental modifications in the test core loading pattern design, and modifications converting any excessive margin from a given limit into additional energy for the test core loading pattern design.

28. The method of claim 22, wherein the procedural recommendations include procedural recommendations for making energy beneficial modifications in the test core loading pattern design, energy detrimental modifications in the test core loading pattern design, and modifications converting any excessive margin from a given limit into additional energy for the test core loading pattern design.

29. The method of claim 1, wherein determining a test core loading pattern design further includes determining a difference between a current core energy of the core and a target core energy for the core and estimating a number of fresh fuel bundles to add or remove to the test core loading pattern design to make up for the difference.

30. The method of claim 22, wherein determining a test core loading pattern design further includes determining a difference between a current core energy of the core and a target core energy for the core and estimating a number of fresh fuel bundles to add or remove to the test core loading pattern design to make up for the difference.

* * * * *